(12) United States Patent
Spence et al.

(10) Patent No.: US 11,705,688 B2
(45) Date of Patent: *Jul. 18, 2023

(54) LASER SYSTEM HAVING A MULTI-STAGE AMPLIFIER AND METHODS OF USE

(71) Applicant: NEWPORT CORPORATION, Irvine, CA (US)

(72) Inventors: David E. Spence, San Jose, CA (US); Bor-Chyuan Hwang, Los Altos, CA (US); Curtis Rettig, Livermore, CA (US); Thomas Sosnowski, San Jose, CA (US); Georg Wien, San Francisco, CA (US); Victor Terpugoff, Pleasanton, CA (US); James D. Kafka, Palo Alto, CA (US)

(73) Assignee: NEWPORT CORPORATION, Irvine, CA (US)

( * ) Notice: Subject to any disclaimer, the term of this patent is extended or adjusted under 35 U.S.C. 154(b) by 296 days.

This patent is subject to a terminal disclaimer.

(21) Appl. No.: 16/992,400

(22) Filed: Aug. 13, 2020

(65) Prior Publication Data
US 2020/0373727 A1 Nov. 26, 2020

Related U.S. Application Data

(63) Continuation of application No. 15/833,906, filed on Dec. 6, 2017, now Pat. No. 10,784,646.

(60) Provisional application No. 62/430,862, filed on Dec. 6, 2016.

(51) Int. Cl.
*H01S 3/00* (2006.01)
*H01S 3/23* (2006.01)
(Continued)

(52) U.S. Cl.
CPC .......... *H01S 3/2325* (2013.01); *H01S 3/0602* (2013.01); *H01S 3/067* (2013.01);
(Continued)

(58) Field of Classification Search
None
See application file for complete search history.

(56) References Cited

U.S. PATENT DOCUMENTS

| 5,181,223 A | 1/1993 | Baer |
| 5,745,284 A | 4/1998 | Goldberg |

(Continued)

FOREIGN PATENT DOCUMENTS

| JP | 2015-519758 A | 7/2015 |
| JP | 2015-228499 A | 12/2015 |

(Continued)

OTHER PUBLICATIONS

Partrick Georges et al., "High-efficiency multipass Ti:sapphire Amplifiers for a Continuous-Wave Single-Mode Laser", Optics Letters vol. 16, No. 3, Feb. 1, 1991, p. 144-146.

(Continued)

*Primary Examiner* — Mark Hellner
(74) *Attorney, Agent, or Firm* — Brian F. Swienton

(57) ABSTRACT

A laser system having a multi-pass amplifier system which includes at least one seed source configured to output at least one seed signal having a seed signal wavelength, at least one pump source configured to output at least one pump signal, at least one multi-pass amplifier system in communication with the seed source and having at least one gain media, a first mirror, and at least a second mirror therein, the gain media device positioned between the first mirror and second mirror and configured to output at least one amplifier output signal having an output wavelength range, the first mirror and second mirror may be configured to reflect the amplifier output signal within the output wavelength range, and at least one optical system may be in communication with the (Continued)

amplifier system and configured to receive the amplifier output signal and output an output signal within the output wavelength range.

19 Claims, 15 Drawing Sheets

(51) Int. Cl.

| | |
|---|---|
| H01S 3/067 | (2006.01) |
| H01S 3/16 | (2006.01) |
| H01S 3/30 | (2006.01) |
| H01S 3/08 | (2023.01) |
| H01S 3/06 | (2006.01) |
| H01S 3/0941 | (2006.01) |
| H01S 3/094 | (2006.01) |

(52) U.S. Cl.
CPC ...... *H01S 3/06758* (2013.01); *H01S 3/08059* (2013.01); *H01S 3/1611* (2013.01); *H01S 3/1673* (2013.01); *H01S 3/2316* (2013.01); *H01S 3/30* (2013.01); *H01S 3/0071* (2013.01); *H01S 3/0078* (2013.01); *H01S 3/0085* (2013.01); *H01S 3/0606* (2013.01); *H01S 3/08095* (2013.01); *H01S 3/0941* (2013.01); *H01S 3/09415* (2013.01); *H01S 3/094003* (2013.01); *H01S 3/094053* (2013.01); *H01S 3/1618* (2013.01); *H01S 3/1643* (2013.01); *H01S 3/2383* (2013.01); *H01S 2301/03* (2013.01)

(56) References Cited

U.S. PATENT DOCUMENTS

| | | | |
|---|---|---|---|
| 5,774,489 | A | 6/1998 | Moulton et al. |
| 5,946,330 | A | 8/1999 | Ozygus et al. |
| 6,654,163 | B1 | 11/2003 | Du et al. |
| 6,904,069 | B2 | 6/2005 | Honea |
| 7,590,160 | B2 * | 9/2009 | Manni .................. H01S 3/0606 372/66 |
| 7,720,126 | B2 | 5/2010 | McCarthy |
| 7,961,771 | B2 | 6/2011 | Manni |
| 8,238,399 | B2 | 8/2012 | Manni |
| 8,451,531 | B2 | 5/2013 | Tokita et al. |
| 8,467,425 | B1 * | 6/2013 | Zhang .................. H01S 3/2316 372/12 |
| 8,934,509 | B2 | 1/2015 | Dilley et al. |
| 8,995,052 | B1 | 3/2015 | Knappe et al. |
| 9,246,303 | B1 | 1/2016 | Rockwell et al. |
| 2006/0114961 | A1 | 6/2006 | Manni |
| 2009/0279577 | A1 | 11/2009 | McCarthy |
| 2010/0290108 | A1 | 11/2010 | Tokita et al. |
| 2011/0243166 | A1 | 10/2011 | Manni |
| 2016/0276798 | A1 | 9/2016 | Zhao et al. |
| 2017/0229835 | A1 * | 8/2017 | Manni .................. H01S 3/0625 |

FOREIGN PATENT DOCUMENTS

| | | |
|---|---|---|
| WO | 2006065982 A2 | 6/2006 |
| WO | WO2009/090935 A1 | 7/2009 |
| WO | 2010142799 A1 | 12/2010 |

OTHER PUBLICATIONS

Kerning Du et al., "partially End-Pumped Nd:YAG Slab Laser With a Hybrid Resonator," Optics Letters, vol. 23, No. 5, Mar. 1, 1998, p. 370-372.
Sridharan, et al., "Zigzag Slabs for Solid-State Laser Amplifiers: Batch Fabrication and Parasitic Oscillation Suppression", Appied Optics, vol. 45, May 10, 2006, pp. 3340-3351.
Ma et al., "Development of Resonator Analysis applied in hybrid Slab Laser with Consideration of Optical Gain and Thermal Lens Effect", Appied Optics, vol. 52 No. 20, Jul. 10, 2013, pp. 4858-4863.
Isyanova, et al., "High-Power, Passively Q-Switched Microlaser—Power Amplifier System", Advanced Solid State Lasers Conference, 2005, 4 pages.
Wall, et al., "A 40-W, Single-Frquency, Nd: YLF Master Osillator/Power Amplifier System", ASSL9940, Nov. 20005, 4 pages.
Dergachev, et al., "Short-Pulse, High-Repetition Rate, High-Power Nd:YLF MOPA System", 5 pages.
Isyanova, et al., "High-Power, Short-Pulse, Compact SLR2000 Laser Transmitter", Optical Society of America, 2003, 5 pages.
Ding, et al., "Theoretical and Experimental Study on the Self-Raman Laser With Nd:YV04 Crystal", IEEE Journal of Quantum Electronics, vol. 42, No. 9, Sep. 2006, pp. 927-933.
Kaminskii, et al., "Tetragonal Vanadates YV04 and GdVO4-New Efficient X(3)-Active Crystals for Raman Laser Converters", Laser Pysics, vol. 11, No. 10, 2001, pp. 1124-1133.
Fan, et al., "1097 nm Nd:YV04 Self-Raman Laser", Optics Communications 284 (2011), pp. 1642-1644.
Li et al., "Continuous-Wave Nd:YV04 Self-Raman Lasers Operating at 1109nm, 1158nm and 1231nm", Optics Express, vol. 21, No. 15, Jul. 29, 2013, pp. 17754-17750.
Kane, et al., "62-dB-Gain Multiple-Pass Slab Geometry Nd:YAG Amplifier", Optics Letters, vol. 11, No. 4, Apr. 1986, pp. 216-218.
Rutherford et al., "Yb:YAG and Nd:YAG Edge-Pumped Siad Lasers", Optics Letters, vol. 26, No. 13,, Jul. 1, 2001, pp. 986-988.
Chen et al., "Second-Stokes YV04/Nd:YVO4/YVO4 Self-Frequency Raman Laser", Optics Letters vol. 37, No. 11, Jun. 1, 2012, pp. 1968-1970.
Shen et al., "108-W Diode-End-Pumped Slab Tm:YLF Laser With High Beam Quality", Appied Physics B. (2015), 118:55-559.
Heese et al., "High-Engergy Picosecond Nd:YVO4 Slab Amplifier For OPCPA Pumping", Applied Physics B (2011) 103:508.
Chen et al., "8.2mJ, 324MW, 5kHz Picosecond MOPA System Based on Nd:YAG Slab Amplifiers", Journal of Optics, 18 (2016) 075503.
Agnesi et al., "High Gain Solid-State Amplifiers For Picosecond Pulses", Advances in Solid-State Lasers: Development and Applications, ISBN 978-953-7619-80-0, Feb. 2010, pp. 630.
Degnan, "A Compact, Totally Passive, Multi-Pass Slab Laser Amplifier Board on Statble, Degenerate Optical Resonators", Sigma Space Corporation, Lanham, MD 20706 USA, 10 pages.
Chinese office action dated Aug. 9, 2021 to Chinese patent application No. 201780075978.6, 14 pages.
Japanese office action dated Nov. 22, 2021 to Japanese patent application No. 2018-530477, 6 pages.
Gong Mali et al., "Efficient Multi-Folded Nd:YVO4 Slab Amplifier", Optics Express, vol. 15 No. 5, Mar. 3, 2008, 8 pages.
European search report dated May 18, 2021 to European patent application No. 17879643.9, 10 pages.
Korean office action dated Oct. 13, 2021 to Korean patent application No. 10-2019-7017790, 12 pages.
European search report dated Oct. 30, 2020 to European patent application No. 17879643.9, 8 pages.
Alexander A. Kaminskii et al., "Tetragonal Vanadates YVO4 and GdVO4—New Efficient X(3)-Materials for Raman Laser", Optics Communications 194, Jul. 1, 2001, p. 201-206.
Shuanghong Ding, et al., "Theoretical and Experimental Study on the Self-Raman Laser With Nd:YVO4 Crystal", IEEE Juournal of Quantum Electronics, vol. 42, No. 9 Sep. 2006, 7 pages.
Hua Lin et al., "105W, <10 ps, TEM00 Laser Output Based on an In-band Pumped Nd:YVO4 Innoslab Amplifier", Optics Letters vol. 37, No. 13, Jul. 1, 2012, p. 2634-2636.
Antonio Agnesi et al., "Amplification of a Low-Power Picosecond Nd:YVO4 Laser by a Diode-Laser Side-Pumped Grazing-Incidence Slad Amplifier", IEEE Journal of Quantum Electronics, vol. 42, No. 8, Aug. 2006, p. 772-776.
Junchi Chen et al., "End Pumped All Internal Reflection Small-Sized Nd: YAG Slab Picoseconds Laser Amplifier", the 8th International Symposium on Ultrafast Phenomena and Terahertz Waves(c) OSA 2016, 3 pages.

(56) References Cited

OTHER PUBLICATIONS

Liu Xu et al., "High-average-power and High-beam-quality Innoslab Picosecond Laser amplifier", Applied Optics, Vo. 51, No. 27, Sep. 20, 2012, p. 6669-6672.
Li Daijun et al., "Picosecond Laser with 400W Average Power and 1mJ Pulse Energy", SPIE Laser, 2011, 7 pages.

* cited by examiner

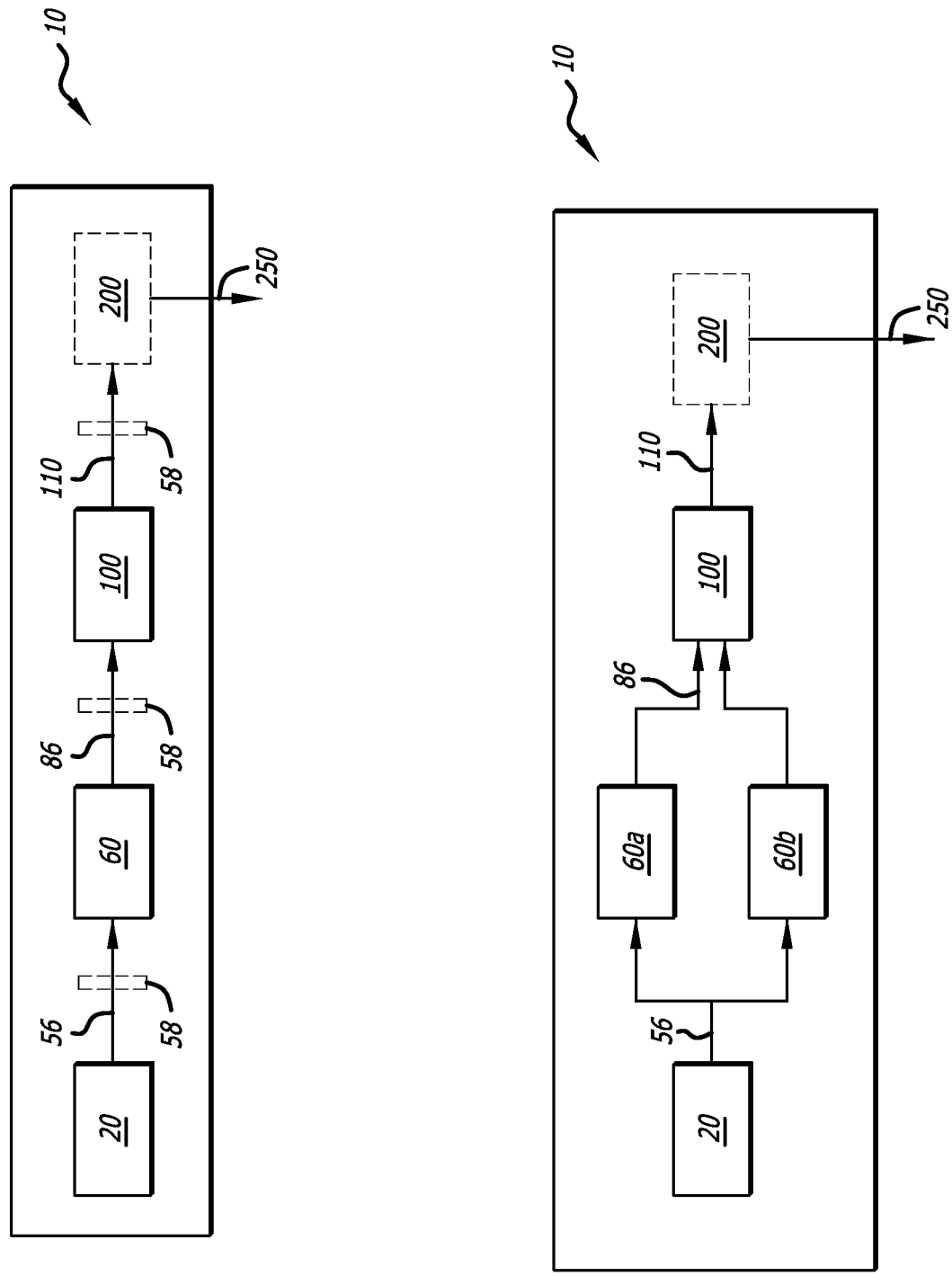

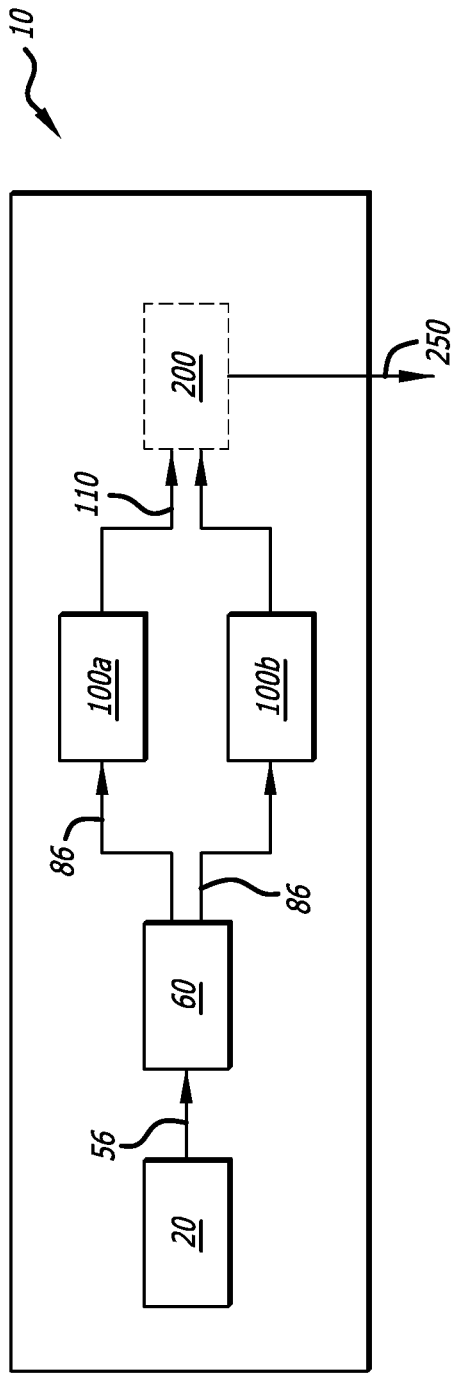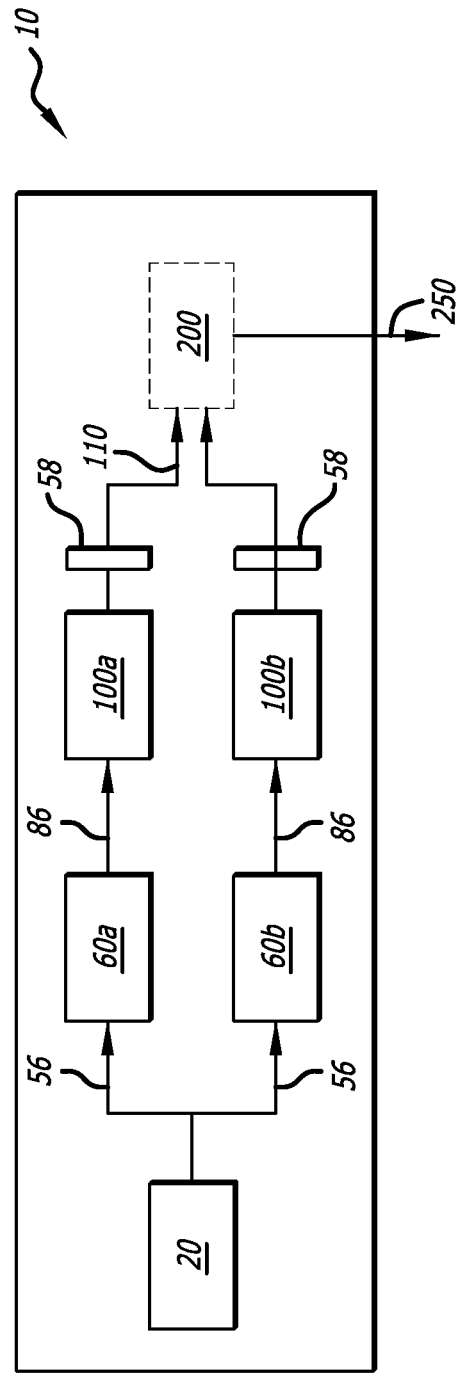

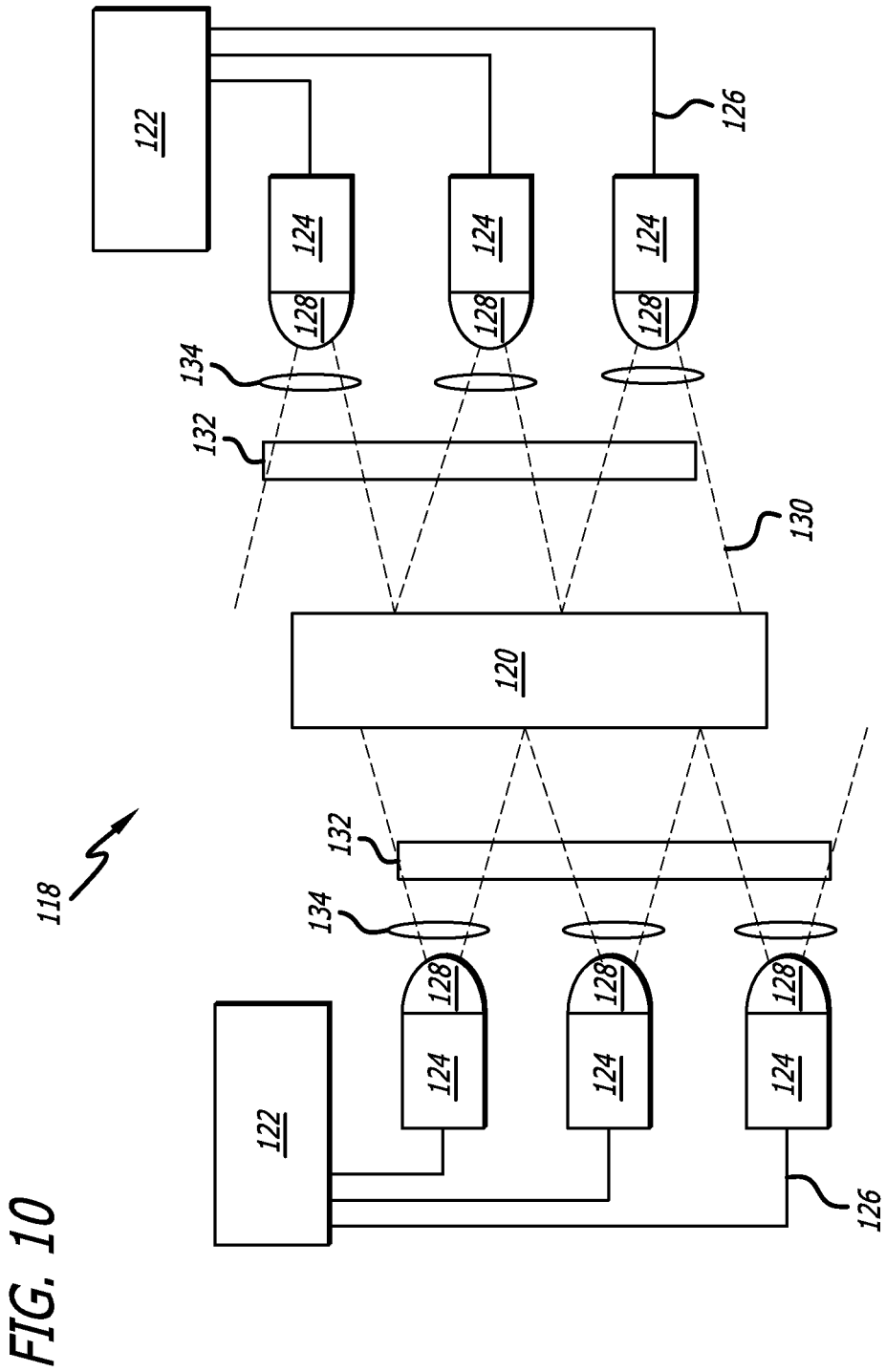

LASER SYSTEM HAVING A MULTI-STAGE AMPLIFIER AND METHODS OF USE

CROSS-REFERENCE TO RELATED APPLICATIONS

This application is a continuation of the U.S. patent application Ser. No. 15/833,906 filed Dec. 6, 2017, which claims priority to U.S. Provisional Patent Application Ser. No. 62/430,862, entitled "Laser System Having Novel Multi-Stage Amplifier and Methods of Use," filed on Dec. 6, 2016, the entire contents of which are incorporated by reference herein.

BACKGROUND

Laser systems are presently used in a wide variety of applications. In the past, conventional optically-pumped solid-state lasers utilized broadband arc lamps or flashlamps to laterally or transversely pump the solid-state laser medium in a resonant cavity. Over time diode-pumped solid state laser systems have become the preferred optically-pumped laser systems for most applications.

While presently available diode-pumped solid state laser systems have proven useful in the past, a number of shortcomings have been identified. For example, some high power applications require high power pumping of the laser gain media. Typically, a gain media receives a pump signal within a confined region of a facet formed on the gain media. As a result, undesirable effects such as thermal lensing within the gain media have proven to be problematic. In addition, injecting a seed signal into the gain media within the confines of a compact facet has led to a decrease the operational lifetime of some gain media.

In light of the foregoing, there is an ongoing need for a laser system having a multi-stage amplifier.

SUMMARY

Various embodiments of laser systems having a multi-stage amplifier are disclosed in herein. In some embodiments, a laser system that utilizes a single multi-pass amplifier for use in various laser systems will be described in detail in the following paragraphs. In other embodiments, a laser system that utilizes a first amplifier and/or pre-amp and at least one multi-pass amplifier for use in various laser systems will be described in detail in the following paragraphs. In one specific embodiment, the present application is directed to a laser system having a multi-pass amplifier system and recites at least one seed source configured to output at least one seed signal having a seed signal wavelength. The seed source may be in communication with at least one multi-pass amplifier system. In some embodiments, the amplifier system includes at least one gain media, a first mirror, and at least a second mirror therein. The gain media device may be positioned between the first mirror and second mirror and configured to output at least one amplifier output signal having an output wavelength range. The first mirror and second mirror may be configured to reflect the amplifier output signal within the output wavelength range. At least one optical system may be in communication with the amplifier system and configured to receive the amplifier output signal and output an output signal within the output wavelength range.

In another embodiment, the present application is directed to a laser system having a multi-pass amplifier system. The laser system includes at least one seed source configured to output at least one seed signal having a seed signal wavelength. At least one first amplifier stage configured to amplify the seed signal and generate at least one amplified seed signal in response thereto is positioned within the laser system. At least one multi-pass second amplifier stage is in communication with the first amplifier stage. The multi-pass second amplifier stage may be configured to receive the amplified seed signal and generate the at least one amplifier output signal within the output wavelength range. In one embodiment, the multi-pass second amplifier stage includes at least one gain media, a first mirror, and at least a second mirror positioned therein. The gain media device, positioned between the first mirror and the second mirror, may be configured to output at least one amplifier output signal having an output wavelength range, wherein the first mirror and the second mirror are configured to reflect the amplifier output signal within the output wavelength range. At least one optical system may be in communication with the amplifier system and configured to receive the amplifier output signal and output an output signal within the output wavelength range.

In yet another embodiment, a laser system having a multi-pass amplifier system is disclosed. The laser system includes at least one seed source configured to output at least one seed signal having a seed signal wavelength. At least one first amplifier stage configured to amplify the at least one seed signal to generate at least one amplified seed signal in response thereto may be in communication with the seed source. At least one multi-pass second amplifier stage configured to receive the at least one amplified seed signal and generator the at least one amplifier output signal within the output wavelength range may be in communication with the first amplifier stage. The multi-pass second amplifier stage includes at least one gain media, a first mirror, and at least a second mirror positioned therein. The gain media device may be positioned between the first mirror and at least the second mirror and may be configured to output at least one amplifier output signal having an output wavelength range. The first mirror and second mirror may comprise a curved mirror configured to reflect the at least one amplifier output signal within the output wavelength range. At least one optical system may be in communication with the amplifier system and configured to receive the amplifier output signal and output an output signal within the output wavelength range.

Other features and advantages of the laser system having a multi-pass amplifier and method of use as described herein will become more apparent from a consideration of the following detailed description.

BRIEF DESCRIPTION OF THE DRAWINGS

The novel aspects of the laser system having a multi-stage amplifier as disclosed herein will be more apparent by consideration of the following figures, wherein:

FIG. 1 shows a schematic diagram of an embodiment of a laser system having a multi-stage amplifier architecture;

FIG. 2 shows a schematic diagram of another embodiment of a laser system having a multi-stage amplifier architecture wherein multiple first amplifier stages are included therein;

FIG. 3 shows a schematic diagram of another embodiment of a laser system having a multi-stage amplifier architecture wherein multiple second amplifier stages are included therein;

FIG. 4 shows a schematic diagram of another embodiment of a laser system having a multi-stage amplifier architecture wherein multiple first amplifier stages and multiple second amplifier stages are included therein;

FIG. 10 shows a schematic diagram of an embodiment of a second amplifier stage used in an embodiment of a laser system having a multi-stage amplifier architecture the gain media device is being pumped by multiple pump sources;

DETAIL DESCRIPTION

Figure 5:
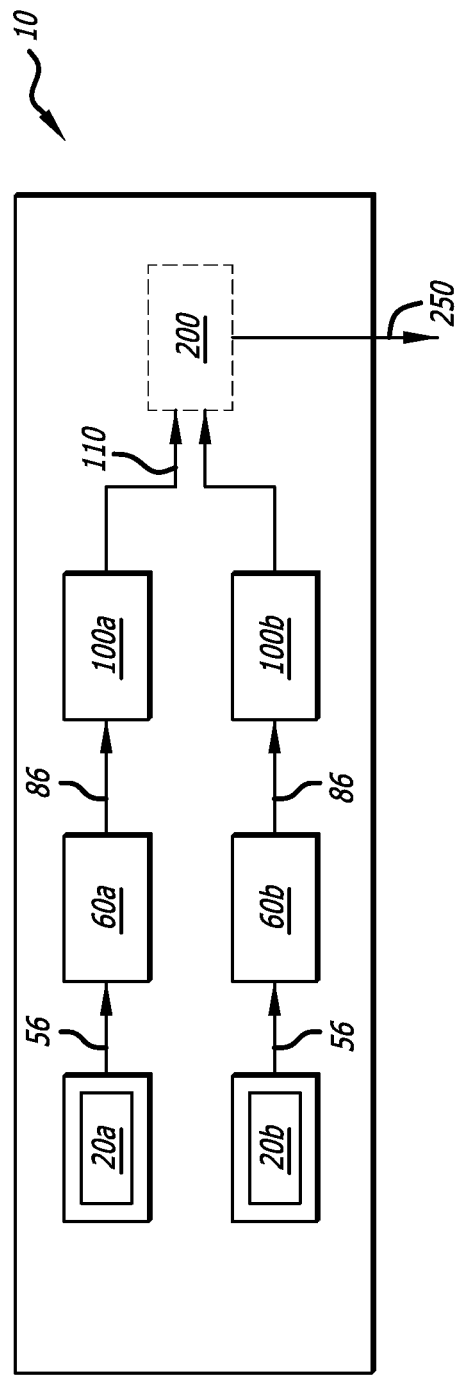
FIG. 5 shows a schematic diagram of another embodiment of a laser system having a multi-stage amplifier architecture wherein multiple seed multiple first amplifier stages and second amplifier stages.

Various embodiments of multi-stage laser amplifiers for use in various laser systems will be described in detail in the following paragraphs. FIGS. 1-5 show various embodiments of laser systems incorporating multi-stage amplifier configurations. As shown in FIG. 1, in one embodiment the laser system 10 includes at least one seed source 20 configured to output at least one seed signal 56 to at least one first amplifier stage 60. FIG. 1 shows the seed source 20 outputting a single seed signal 56 to a single first amplifier stage 60. In contrast, FIGS. 2 and 3 shows a single seed source 20 outputting multiple seed signals 56 to a multiple first amplifier stages 60a, 60b. In addition, FIG. 3 shows a single seed source 20 outputting a single seed signal to a single first amplifier stage 60 which outputs multiple amplified signals 86 to multiple $2^{nd}$ amplifier stages 100a and 100b. In addition, FIG. 4 shows a single seed source 20 outputting multiple seed signals for multiple $1^{st}$ amplifiers stages a 60a and 60b and multiple $2^{nd}$ stages 100a and 100b. In addition, as shown in FIG. 5, multiple seed sources 20a, 20b may be used to deliver multiple seed signals 56 to one or more first amplifier stages 60a, 60b. Those skilled in the art will appreciate that any number of seed sources may be configured to output any number of seed signals to any number of first amplifier stages 60.

As shown in FIG. 1, optionally one or more optical systems, devices, or components 58 (hereinafter "optical device") may be positioned anywhere within the various embodiments of the laser systems 10 shown in FIGS. 1-5. More specifically, FIGS. 1 and 4 show various embodiments of a laser system having one or more optical systems 58 positioned therein, however, it is understood that any number of optical systems and/or device 58 may be used throughout the various embodiments of laser systems shown in FIGS. 1-5. In one embodiment, the optical device 58 comprises one or more wavelength filters. Exemplary wavelength filters include, without limitation, one or more dichroic mirrors, wavelength selective devices, optical filters, and the like. In another embodiment, the optical device 58 comprises one or more lenses. In another embodiment, the optical device 58 comprises one or more sensors. Those skilled in the art will appreciate that any variety of optical devices may be used in the present laser system, including, without limitations, lenses, filters, mirrors, sensors, modulators, polarizers, waveplates, masks, attenuators, wavelength filters, spatial filters, and the like.

Referring again to FIG. 1, the first amplifier stage 60 may be configured to receive the seed signal 56 from the seed source 20 and amplify the seed signal 56 to produce at least one amplified seed signal 86. In one embodiment, the first amplifier stage 60 is configured to output a single amplified seed signal 86 to a single second amplifier stage 100 (See FIGS. 1 and 5). In contrast, FIG. 2 shown multiple first amplifier stages 60a, 60b each outputting a single amplified seed signal 86 to a single second amplifier stage 100. In the alternative, FIG. 3 shows an embodiment of a laser system 10 having a single first amplifier stage 60 outputting multiple amplified seed signals 86 to multiple second amplifier stages 100a, 100b. Any number of first amplifier stages 60 may be used within the laser system 10. Further, in the embodiment shown in FIG. 2, the multiple first amplifier stages 60a, 60b are shown in a parallel configuration. However, those skilled in the art will appreciate that the first amplifier stages 60a, 60b may be sequentially positioned (in series). Similarly, the various components of the laser system 10, including the seed source 20a, 20b, first amplifier stage 60a, 60b, and/or second amplifier stage 100a, 100b, if present, may be configured in either a parallel architecture or sequentially in a serial configuration or any combination thereof.

As shown in FIG. 1, the laser system 10 may include at least one second amplifier stage 100 therein. In the illustrated embodiment, the second amplifier stage 100 may be in communication with one or more first amplifier stages 60 positioned within the laser system 10. FIGS. 1 and 2 show an embodiment of a laser system having a single second amplifier stage 100 positioned therein. Optionally, as shown in FIGS. 3-5, various embodiments of laser systems having multiple second amplifier stages 100a, 100b positioned therein. In one embodiment, the second amplifier stages 100a, 100b are in communication with a single first amplifier stage 60. Optionally, multiple second amplifier stages 100a, 100b are in communication with one or more first amplifier stages 60a, 60b (See FIGS. 2, 4 and 5). Any number of second amplifier stages 100 may be used in the laser system 10. Further, any number of additional amplifier stages may be used with the laser system 10.

As shown in FIGS. 1-5, at least one amplified output signal 110 may be emitted from the one or more second amplifier stages 100 positioned within the laser system 10. As shown in FIGS. 1 and 2, a single amplified output signal 110 is emitted from the second amplifier stage 100. In the alternative, FIGS. 3-5 show various embodiments of a laser system 10 wherein multiple amplified output signals 110 are emitted from numerous second amplifier stages 100 positioned within the laser system 10. In the illustrated embodiments, the amplified output signal 110 is directed into one or more optical systems or devices 200 configured to output at least one output signal 250. In one embodiment, optical system 200 comprises one or more isolators. In another embodiment, the optical system 200 comprises one or more modulators. Optionally, the optical system 200 may comprise at least one telescope. Further, the optical system 200 may comprise one or more laser systems, amplifiers, and the like. For example, the optical system 200 may comprise one or more additional multi-stage amplifiers. The additional multi-stage amplifier 200 may include one or more single pass amplifiers. Optionally, the additional multi-stage amplifier 200 may include a one or more multi-pass amplifiers. In another embodiment, the optical system 200 may include at least one single stage amplifier. Optionally, the optical system 200 may include one or more nonlinear optical crystals. Optionally, the laser system 10 need not include an optical system 200.

Figure 6:
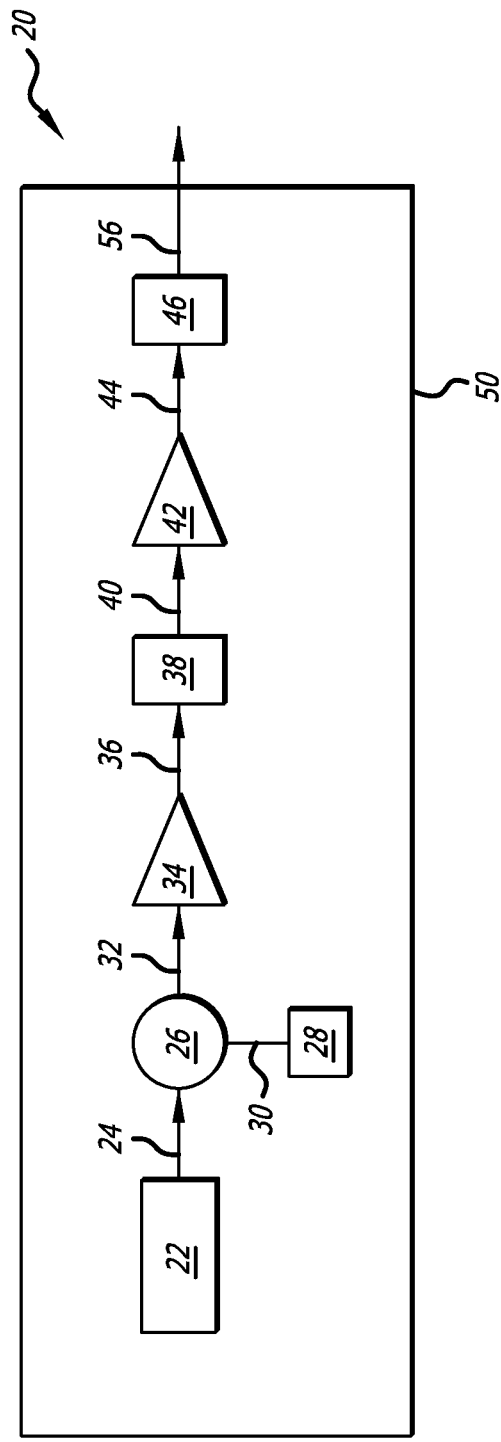
FIG. 6 shows a schematic diagram of an embodiment of a seed laser system used in an embodiment of a laser system having a multi-stage amplifier architecture.

FIG. 6 shows a schematic view of an embodiment of a seed source 20 for use with the laser system 10 shown in FIG. 1. As shown, the seed source 20 includes at least one seed laser 22 therein. In one embodiment, the seed laser 22 comprises a diode laser system. For example, the seed laser 22 may comprise one or more gain switched diode laser system. In another embodiment, the seed laser comprises one or more fiber amplified diode laser sources. Further, the seed source 20 may comprise an injection seed diode laser system. Optionally, the seed source 22 may comprise one or more fiber lasers devices. In short, any type of laser system may be used as the seed laser 22 in the seed source 20.

The seed laser 22 may be configured to output at least one seed signal 24 having a wavelength from about 400 nm to about 1400 nm. For example, in one embodiment, the seed laser 22 outputs a seed signal 24 having a wavelength from about 600 nm to about 1200 nm. For example, the seed signal 24 may have a wavelength of about 1064 nm. In yet another embodiment, the seed signal 24 has a wavelength of about 1030 nm. Further, the seed laser 22 may be configured to output a pulsed output. For example, the seed laser 22 may be configured to output a seed signal 24 having a repetition rate of 100 kHz or more. In another embodiment, the seed laser 22 may be configured to output a seed signal 24 having a repetition rate of 1 MHz or more. Optionally, the seed laser 22 may be configured to output a seed signal 24 having a repetition rate of 15 MHz or more. For example, the seed laser 22 may be configured to output a seed signal 24 having a repetition rate of about 20 MHz. Optionally, the seed laser 22 may be configured to output a seed signal 24 having a repetition rate of 10 kHz.

Referring again to FIG. 6, the seed laser 22 may be configured to output a seed signal 24 having any desired pulse width. In one embodiment, the seed laser 22 may be configured to output a seed signal 24 having a pulse width of less than about 100 ps. In another embodiment, the seed laser 22 may be configured to output a seed signal 24 having a pulse width of less than about 50 ps. Optionally, seed laser 22 may be configured to output a seed signal 24 having a pulse width of less than about 25 ps. In another embodiment, the seed laser 22 may be configured to output a seed signal 24 having a pulse width of less than about 1 ps. Further, the seed laser 22 may be configured to output a seed signal 24 having a power of about 1 µW to about 200 µW. For example, the seed laser 22 may be configured to output a seed signal 24 having a power of about 40 µW to about 80 µW. In another embodiment, the seed laser 22 may be configured to output a seed signal 24 having a power of about 65 µW to about 85 µW.

Referring again to FIG. 6, the seed source 20 may include one or more optical filters 26 configured to filter the seed signal 24 to produce at least one filtered or chirped signal 32 (hereinafter "filter signal"). In one embodiment, the optical filter 26 comprises at least one Bragg reflector. For example, the optical filter 26 may comprise at least one chirped fiber Bragg grating. In the illustrated embodiment, the optical filter 26 is in communication with at least one sensor or control device 28 via at least one conduit 30. For example, during use the control device 28 may be configured to permit the user to selectively vary the range of wavelength transmission through the optical filter 26. As such, the wavelength characteristics of the chirped signal 32 may be easily varied. Optionally, the optical filter 26 may be configured to permit the user to selectively adjust any variety characteristics of the chirped signal 32.

As shown in FIG. 6, a first amplifier 34 may be included within the seed source 20 to amplify the chirped signal 32. In one embodiment, the first amplifier 34 comprises at least one fiber amplifier. In one embodiment, the type of first amplifier 34 and second amplifier 42 (if present) used in the seed source 20 may dependent on the type of amplifier stage 60 and second amplifier stage 100 used in the laser system 10. For example, a Yb:fiber amplifier operating at a wavelength of about 1030 nm may be used as the first amplifier 34 in the seed source 20 if the first and second amplifier stages 60, 100 include Yb:YAG. In contrast, a Yb:fiber amplifier operating at a wavelength of about 1064 nm may be used as the first amplifier 34 in the seed source 20 if the first and second amplifier stages 60, 100 include Nd:YVO$_4$. Optionally, any variety of devices may be used in the seed source 20. The first amplifier 34 is configured to amplify the signal 32 to produce at least one amplified seed signal 36, which may be directed into at least one modulator system or device 38.

Referring again to FIG. 6, the modulator device 38 is configured to alter the repetition frequency of the pulsed amplified seed signal 36 to produce at least one modulated amplified seed signal 40. In one embodiment, the modulator device 38 is configured to output a modulated seed signal 40 having a repetition rate of about 5 kHz to about 1000 kHz.

In another embodiment, the modulator device 38 is configured to output a modulated amplified seed signal 40 having a repetition rate of about 100 kHz to about 500 kHz. Optionally, the modulator device 38 is configured to output a modulated amplified seed signal 40 having a repetition rate of about 250 kHz to about 350 kHz. For example, the modulator device 38 is configured to output a modulated amplified seed signal 40 having a repetition rate of about 333 kHz. In one embodiment, the modulator device 38 is configured to output a modulated seed signal 40 having a repetition rate greater than 1000 kHz. In one embodiment, the modulator device 48 comprises an acousto-optic modulator. Optionally, any variety of alternate devices may be used, including, without limitations, electro-optic modulators, amplitude modulators, phase modulators, liquid crystal modulators and the like. In an alternative embodiment seed source 20 does not include modulator device 38.

As shown in FIG. 6, at least one second amplifier 42 may be included within the seed source 20 to amplify the modulated amplified seed signal 40 to produce at least one amplified modulated signal 44. In one embodiment, the second amplifier 42 comprises at least one Yb:fiber amplifier. Optionally, any variety of devices may be used in the seed source 20. For example, solid-state amplifiers may optionally be used in place of or in addition to fiber amplifiers. Further, any number of additional amplifiers may be used in the seed source 20. The amplified modulated signal 44 may be directed into at least one isolator 46 positioned within or in communication with the seed source 20. In one embodiment, the isolator 46 is configured to reduce or eliminate back reflections of the amplified modulated signal output 56 in the seed source 20. Those skilled in the art will appreciate that any number of isolators 46 may be used anywhere within the seed source 20. The isolator 46 may be configured to output at least one seed signal 56 to at least one first amplifier stage 60 of the laser system 10. In one embodiment, the seed signal 56 has a pulse width of about 1 ps to about 100 ps and a pulse energy of about 10 μJ to about 70 μJ. For example, the seed signal 56 may have a pulse width of about 20 ps and a pulse energy of about 40 μJ. Further, the seed signal 56 may have a repetition rate of about 300 kHZ to about 450 kHz and a power of about 5 mW to about 100 mW. Optionally, any variety of additional optical elements or devices may be used in the seed source 20, including, without limitations, lenses, mirrors, fold mirrors, planar mirror, curved mirror, dichroic filters, notch filters, gratings, sensors, optical filters, attenuators, modulators, circulators, fiber Brag gratings, laser diodes, volume Bragg gratings, and the like. In the illustrated embodiment, the various components of the seed source 20 are positioned within at least one housing 50. Those skilled in the art will appreciate that the various components of the seed source 20 may be positioned within multiple housings or may, in the alternative, be located within another subsystem of the laser system 10.

Figure 7:
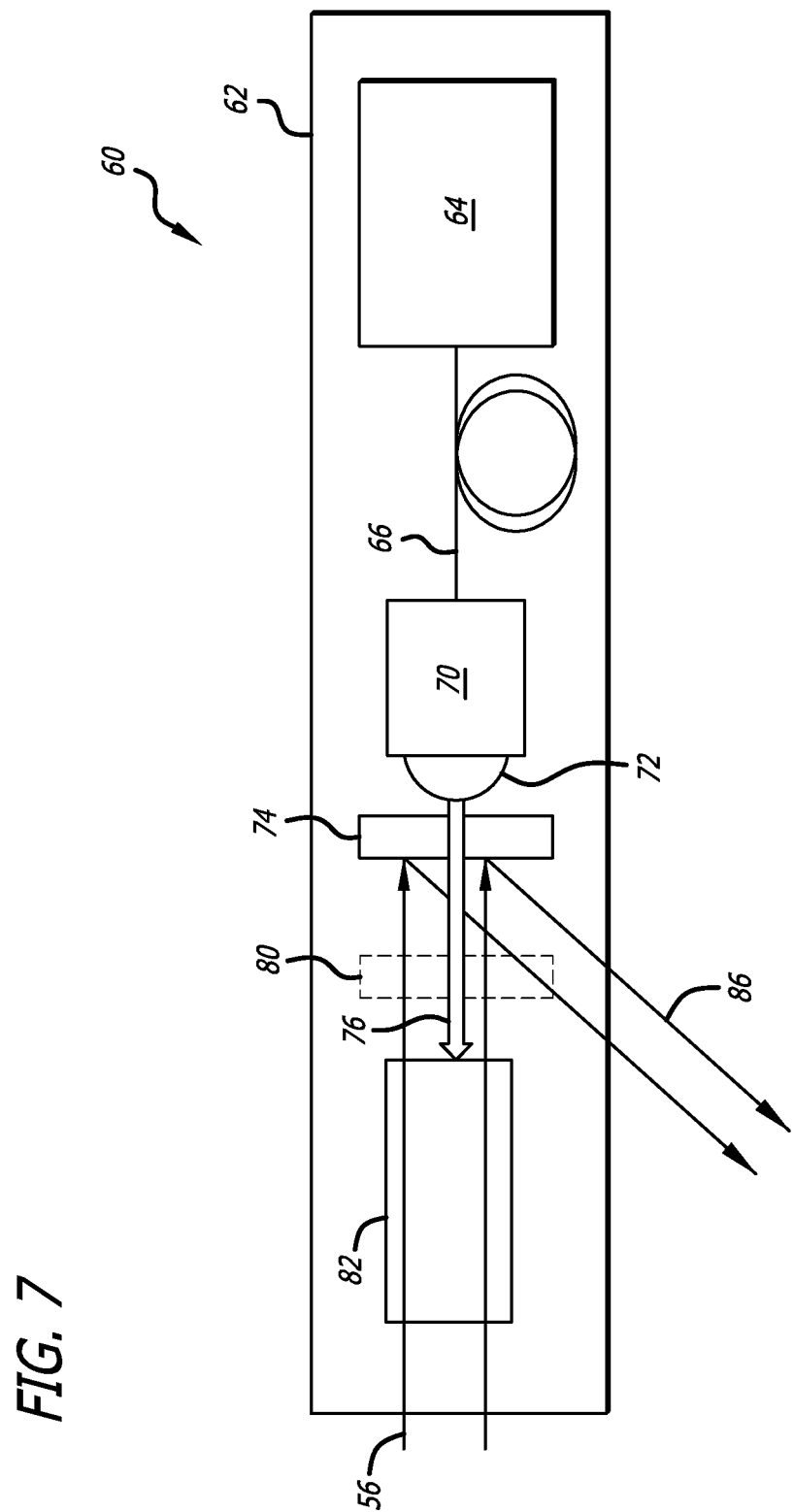
FIG. 7 shows a schematic diagram of an embodiment of a first amplifier stage used in an embodiment of a laser system having a multi-stage amplifier architecture.

FIG. 7 shows an embodiment of the first amplifier stage 60 shown in FIGS. 1-5 above. As shown, the first amplifier stage 60 may include at least one housing 62 configured to contain the various components of the first amplifier stage 60 therein. Optionally, the first amplifier stage 60 need not include a housing 62. At least one first amplifier pump source 64 may be used to generate at least one pump signal 76. In the illustrated embodiment, the first amplifier pump source 64 comprises a fiber coupled diode pump source configured to output at least one pump signal 76 having a wavelength from about 600 nm to about 1000 nm; although those skilled in the art will appreciate that any variety of pump source may be used within the first amplifier pump source 64. In one embodiment, the pump signal 76 has a wavelength of about 900 nm to about 1000 nm. For example, the pump signal 76 may have a wavelength of about 940 nm. In another embodiment, the pump signal 76 may have a wavelength of about 969 nm. Optionally, the pump signal 76 may have a wavelength of about 808 nm. In another embodiment, the pump signal 76 may have a wavelength of about 880 nm. Further, the pump source 62 may be configured to output a continuous wave pump signal or, in the alternative, a pulsed pump signal. For example, the pump signal 76 may have a repetition rate of about 1 kHz to 100 MHz or more. For example, in one embodiment the pump signal 76 has a repetition rate of about 10 kHz. In another embodiment, the pulse signal 76 has a repetition rate of about 50 MHz to about 125 MHz.

Referring again to FIG. 7, at least one fiber optic conduit 66 may be used to deliver the pump signal 76 to a desired location. Optionally, the pump source 64 need not include a fiber optic conduit 66. The fiber optic conduit 66 terminates with at least one pump signal delivery system 70. In one embodiment, the pump signal delivery system 70 comprises a cleaved fiber optic face. In another embodiment, the pump signal delivery system 70 may include one or more lenses, mirrors, filters, sensors, positioning devices (such a v-grooves, chucks, and the like), and similar devices. In the illustrated embodiment, at least one optical component 72 is coupled to the pump signal delivery system 70, although the pump signal delivery system 70 may include such an element therein or may operate without including such a device.

As shown, the pump signal 76 is directed out of the pump signal delivery system 70, traverse through at least one reflector 74, and is incident upon at least one gain media 82 positioned within the first amplifier stage 60. In one embodiment, the reflector 74 comprises at least one dichroic mirror configured to transmit at least one optical signal having a wavelength of less than about 1000 nm there through, while reflecting substantially all light having a wavelength of greater than about 1000 nm. Those skilled in the art will appreciate that any variety of optical reflectors configured to transmit at least one optical signal having a wavelength of less than about 1000 nm there through, while reflecting substantially all light having a wavelength of greater than about 1000 nm may be used in the present system. Further, the reflector 74 may be configured to transmit at least one optical signal having a wavelength of less than about 1000 nm there through, while reflecting substantially all light having a wavelength of greater than about 1020 nm. In another embodiment, Further, the reflector 74 may be configured to transmit at least one optical signal having a wavelength of less than about 1000 nm there through, while reflecting substantially all light having a wavelength of greater than about 1020 nm. In another embodiment, the reflector 74 may be configured to transmit multiple optical signals. For example, the reflector 74 may be configured to transmit at least one optical signal having a wavelength of less than about 1000 nm and at least one optical signal having a wavelength of greater than about 1100 nm, while substantially reflecting all light having a wavelength of about 1064 nm. In another embodiment, the reflector 74 may be configured to transmit at least one optical signal having a wavelength of less than about 1000 nm and at least one optical signal having a wavelength of greater than about 1100 nm, while substantially reflecting all light having a wavelength of about 1030 nm.

Referring again to FIG. 7, optionally at least optical element 80 may be positioned anywhere within the first amplifier stage 60. Exemplary optical elements 80 include, without limitations, fold mirrors, planar mirror, curved mirrors, lenses, thermal management devices, fans, chillers, filters, and the like. As shown, the pump signal 76 traverses through the optical element 80 and is incident on the gain media 82. In one embodiment, the gain media 82 comprises at least one slab, rod, disk, or similar body constructed of a desired gain material. Exemplary gain materials include, without limitations, Nd:YVO$_4$, Nd:GdVO$_4$, Nd:YAG, Nd:YLF, Nd:glass, Yb:YAG, Yb:KGW, Yb:CaF$_2$, Yb:CALGO, Yb:Lu$_2$O$_3$, Yb:S-FAP, Yb:glass, semiconductor gain media, ceramic laser materials, and the like.

As shown in FIG. 7, at least one seed signal 56 from at least one seed source (See FIGS. 1-5) is incident on the gain media 82 which amplifies the seed signal 56 to output at least one amplified seed signal 86. For example, in one embodiment, a seed signal 56 has a pulse width of about 20 ps, a pulse energy of about 40 μJ, repetition rate of about 333 kHz, and a power of about 5 mW to about 15 mW prior to amplification. Thereafter, the first amplifier stage 60 may be configured to output at least one amplified seed signal 86 may having a pulse width of about 20 ps, a pulse energy of about 18 μJ, a repetition rate of about 333 kHz, and a power of about 5 W to about 15 W to the second amplifier stage 100. Those skilled in the art will appreciate that any number of first amplifier stages 60 may be used in the laser system 10.

FIGS. 8-14 show various embodiments of a second amplifier stage 100 for use in a multi-stage amplifier for laser systems. As shown, the second amplifier stage 100 may be positioned within housing 112 or, in the alternative, may be positioned within the housing of a larger optical system or laser. As shown, the second amplifier stage 100 includes at least one gain media device 120 therein. In one embodiment, the gain media device 120 is Yb:YAG. In another embodiment, the gain media device 120 is Nd:YVO$_4$. Exemplary gain materials include, without limitations, Nd:YVO$_4$, Nd:GdVO$_4$, Nd:YAG, Nd:YLF, Nd:glass, Yb:YAG, Yb:KGW, Yb:CaF$_2$, Yb:CALGO, Yb:Lu$_2$O$_3$, Yb:S-FAP, Yb:glass, semiconductor gain media, ceramic laser materials, and the like. In one embodiment, the gain media device 120 comprises at least one slab, rod, disk, or similar body constructed of a desired gain material. For example, in the illustrated embodiments, the gain media device 120 comprises elongated facets $F_{Lon}$ and compact facets $F_{com}$. As such, the length of the elongated facets $F_{Lon}$ may be greater than the length of the compact facets $F_{com}$. In the illustrated embodiments, the energy and/or fluence of the seed signal 86 incident on the gain media device 120 is more distributed over at least one elongated facet $F_{Lon}$ (i.e. transverse pumping) thereby reducing the effects of thermal lensing while reducing the likelihood of damaging the gain media device 120. In the alternative, those skilled in the art will appreciate that the gain media device 120 may be seeded via compact facets $F_{com}$. In another embodiment, the gain media device 120 may be seeded via the elongated facets $F_{Lon}$ and compact facets $F_{com}$. As a result, those skilled in the art will appreciate that the gain media device 120 may be manufactured in any variety of shapes, dimensions, and configurations.

Referring again to FIGS. 8-14, the gain media device 120 may be proximate to at least one reflector. In the illustrated embodiment, the gain media device 120 is positioned between two reflectors 132 configured to reflect at least a portion of at least one amplified signal 86 from at least one first amplifier stage 60 into the gain media device 120. The gain media device 120 is configured to be pumped by at least one pump source 122. Optionally, any variety of alternate laser systems may be used to pump the gain media device 120. Further, at least one pump source 122 may be configured to output at least one pump signal 130 having a wavelength from about 600 nm to about 1000 nm. In one embodiment, the pump signal 130 has a wavelength of about 900 nm to about 1000 nm. For example, the pump signal 130 may have a wavelength of about 940 nm. In another embodiment, the pump signal 130 may have a wavelength of about 969 nm. Optionally, the pump signal 130 may have a wavelength of about 808 nm. In another embodiment, the pump signal 130 may have a wavelength of about 880 nm. Further, the pump source 122 may be configured to output a continuous wave pump signal or, in the alternative, a pulsed pump signal. For example, the pump signal 130 may have a repetition rate of about 1 kHz to 100 MHz or more. For example, in one embodiment the pump signal 130 has a repetition rate of about 10 kHz. In another embodiment, the pulse signal 130 has a repetition rate of about 50 MHz to about 125 MHz.

In the illustrated embodiment, multiple fiber coupled diode pump sources 122 are configured to provide one or more pump signals 130 to the gain media device 120. In the illustrated embodiment, the diode pump source 122 is coupled to at least one fiber optic conduit 126. The fiber optic conduits 126 may be, but need not be, coupled to one or more pump signal delivery systems 124 (See FIG. 10). In one embodiment, the pump signal delivery system 124 may comprise one or more than one v-grooves or similar positioning features configured to align or otherwise position one or more fiber optic conduits 126 in close proximity. In one embodiment the fiber optic conduits 126 are separated by a distance less than about 500 um. In another embodiment the fiber optic conduits 126 are separated by a distance greater than about 500 um. In yet another embodiment the fiber optic conduits 126 are separated by a distance of about 100 um. As such, the fiber optic conduits 126 may be positioned so as to produce the output having an elongated profile such as the output of an elongated pump source such as a diode bar, lightpipe, waveguide, or similar structure. As shown in FIG. 10, the pump signal delivery system 124 may include one or more filters, sensors, lenses and the like, configured to direct the pump signal 130 to the gain media device 120. For example, in the illustrated example, one more lenses or similar optical components 128, 134 may be used to form a telescope, collimator, homogenizer, diffractive beam shaper, refractive beam shaper, lens array, and the like to condition the pump signal 130 for pumping the gain media device 120. In one embodiment, multiple optical components 128, 134 may be positioned proximate to multiple fiber optic conduits 126 (See FIG. 100). In an alternate embodiment, a single optical component 128, 134 may be used rather the multiple individual optical components.

Figure 8:
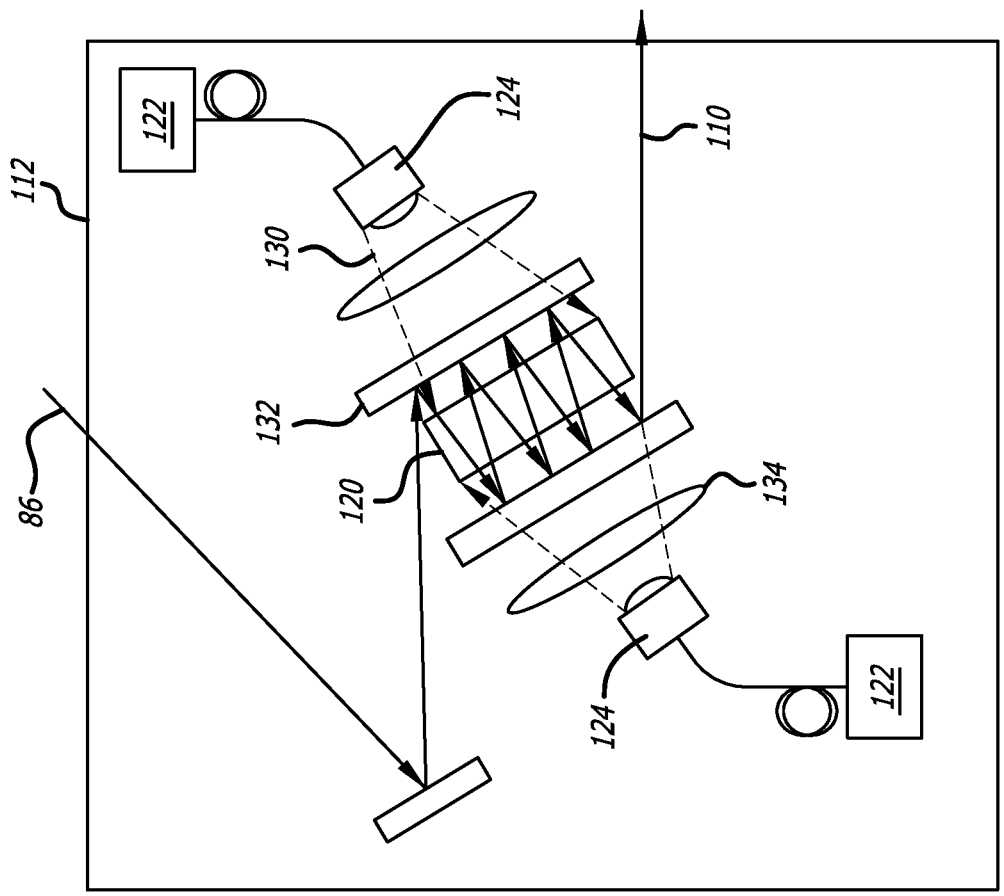
FIG. 8 shows a schematic diagram of an embodiment of a second amplifier stage used in an embodiment of a laser system having a multi-stage amplifier architecture.
Figure 9:
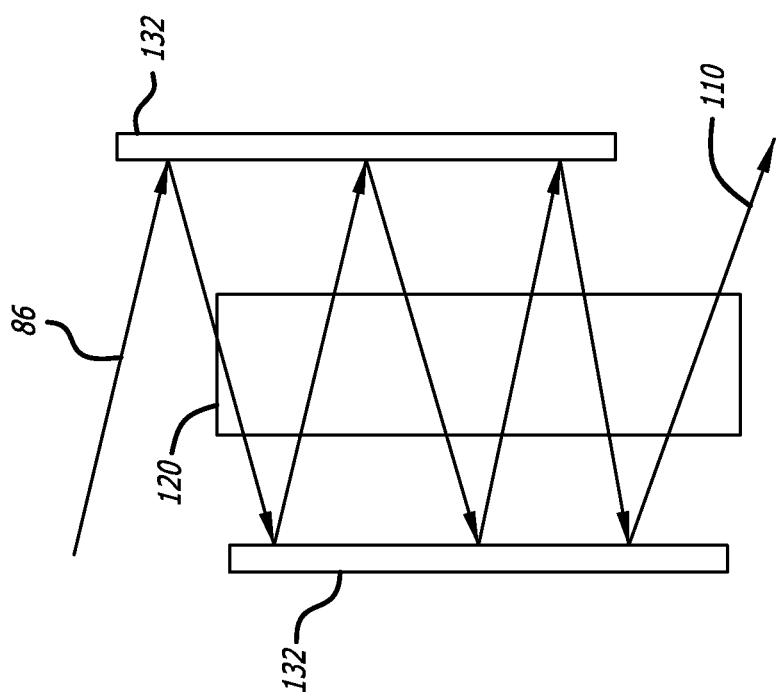
FIG. 9 shows a schematic diagram of an embodiment of a second amplifier stage used in an embodiment of a laser system having a multi-stage amplifier architecture wherein a first reflector and at least a second reflector are used to seed the gain media device.

As shown FIGS. 8 and 10, the pump signal 130 is directed out of the pump signal delivery system 126, traverse through at least one reflector 132, and is incident upon at least one gain media device 120 positioned within the second amplifier stage 100. In the illustrated embodiment, the gain media device 120 is side-pumped by the pump signal 130. In another embodiment, the gain media device 120 is being pumped along an elongated facet of the gain media device 120 by the pump signal 130. Optionally, the gain media device 120 maybe end-pumped by the pump signal 130. In one embodiment, the reflector 132 comprises at least one dichroic mirror (planar or curved) configured to transmit at least one optical signal having a wavelength of less than about 1000 nm there through, while reflecting substantially all light having a wavelength of greater than about 1000 nm. Those skilled in the art will appreciate that any variety of optical reflectors configured to transmit at least one optical signal having a wavelength of less than about 1000 nm there through, while reflecting substantially all light having a wavelength of greater than about 1000 nm may be used in the present system. Further, the reflector 132 may be configured to transmit at least one optical signal having a wavelength of less than about 1000 nm there through, while reflecting substantially all light having a wavelength of greater than about 1020 nm. In another embodiment, Further, the reflector 132 may be configured to transmit at least one optical signal having a wavelength of less than about 1000 nm there through, while reflecting substantially all light having a wavelength of greater than about 1030 nm. In another embodiment, the reflector 132 may be configured to transmit multiple optical signals. For example, the reflector 132 may be configured to transmit at least one optical signal having a wavelength of less than about 1000 nm and at least one optical signal having a wavelength of greater than about 1100 nm, while substantially reflecting all light having a wavelength of about 1064 nm. In another embodiment, the reflector 132 may be configured to transmit at least one optical signal having a wavelength of less than about 1000 nm and at least one optical signal having a wavelength of greater than about 1100 nm, while substantially reflecting all light having a wavelength of about 1030 nm As shown in FIGS. 8-10, the reflectors 132 receive the amplified seed signal 86 and repeatedly direct the seed signal 86 into the gain media device 120 for multi-pass amplification, thereby outputting an amplified output signal 110. For example, in one embodiment, the amplified seed signal has a pulse width of about 20 ps, a pulse energy of about 18 µJ, a repetition rate of about 333 kHz, and a power of about 5 W to about 15 W, while output of the second amplifier stage 120 has a pulse width of about 20 ps, a pulse energy of about 175 µJ, a repetition rate of about 333 kHz, and a power of about 58 W or more.

Figure 12:
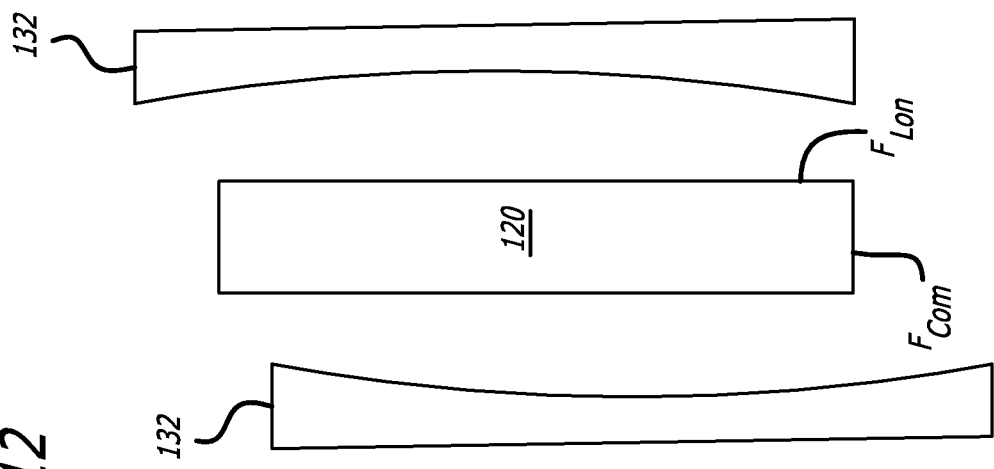
FIG. 12 shows a schematic diagram of an embodiment of a first reflector and at least a second reflector used in an embodiment of a laser system having a multi-stage amplifier wherein the first reflector and second reflector are curved.
Figure 11:
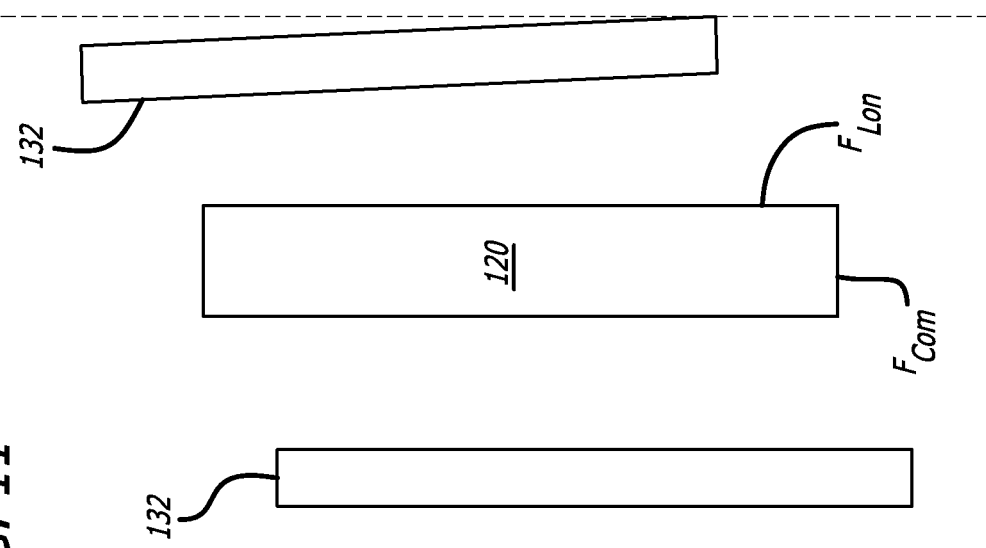
FIG. 11 shows a schematic diagram of an embodiment of a first reflector and at least a second reflector used in an embodiment of a laser system having a multi-stage amplifier wherein the first reflector and second reflector are angled relative to the gain media device.
Figure 13:
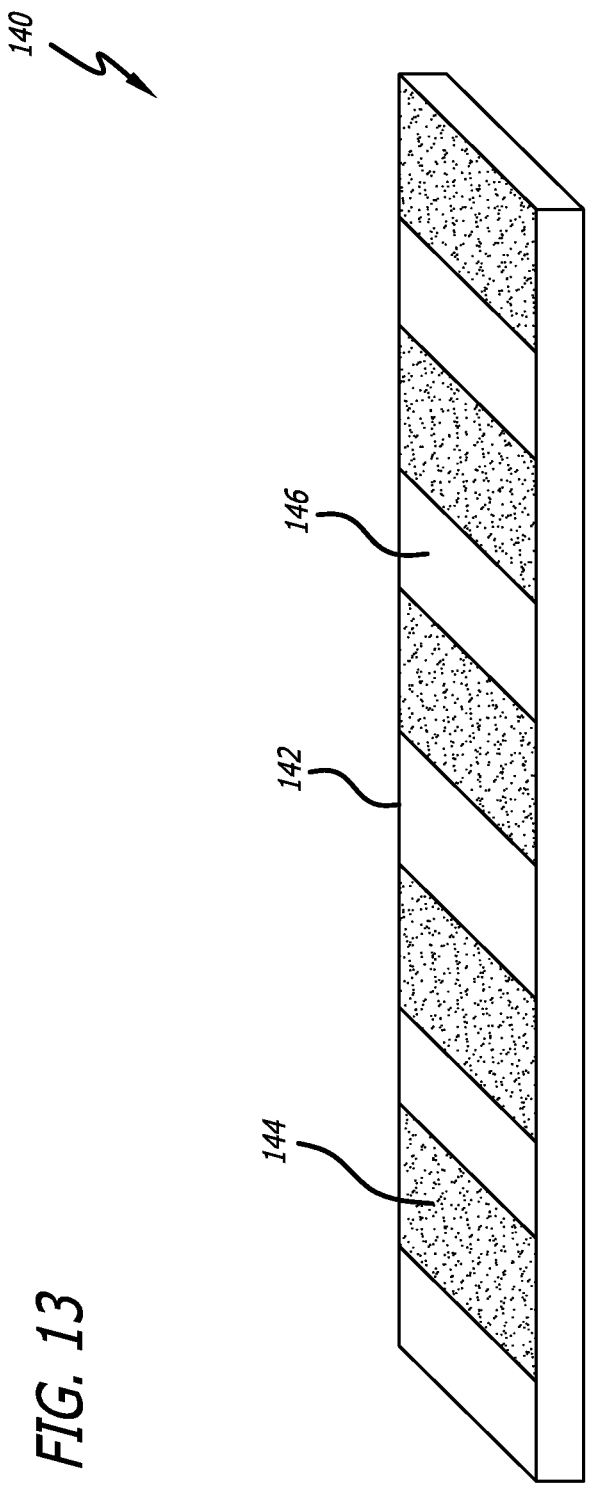
FIG. 13 shows an elevated perspective view of an embodiment of a reflector in an embodiment of a laser system having a multi-stage amplifier wherein the reflector includes areas of high reflectance and areas of high transmission.
Figure 14:
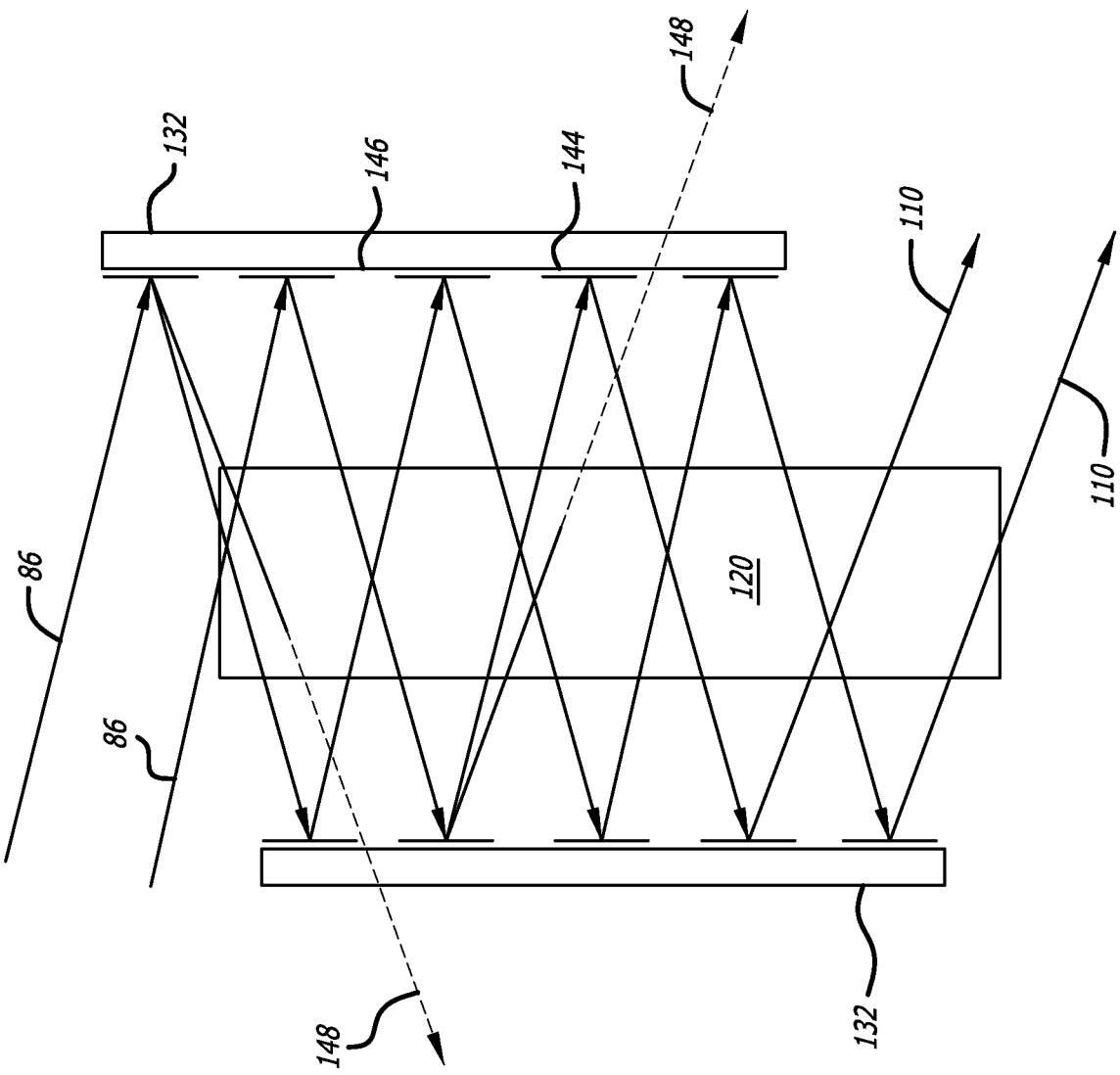
FIG. 14 shows a schematic diagram of an embodiment of a second amplifier stage used in an embodiment of a laser system having a multi-stage amplifier architecture incorporating an embodiment of the reflector device shown in FIG. 13.

FIG. 11 shows an alternate embodiment of reflectors used in the second amplifier stage 100. As shown, the reflectors 132 include a substantially planar body wherein at least one reflector is positioned at a slight wedge angle relative to the gain media device 120. In the alternative, FIG. 12 shows reflectors 132 include a substantially curved body. Those skilled in the art will appreciate that the reflectors 132 may be manufactured with having any desired shape, size, and configuration. Optionally, at least one reflector may include areas or regions of high reflectance and areas or regions of high transmission at a desired wavelength formed thereon. For example, FIGS. 13 and 14 shows an embodiment of a novel "striped" reflector 140 having a reflector body 142. As shown, the reflector body 142 includes areas or regions of high reflectance 144 at a desired wavelength and areas or regions of high transmission 146 at a desired wavelength. During use, the amplified seed signal 86 is incident on the reflector body 142. In one embodiment, at least one reflector body 142 is aligned such the amplified seed signal 86 is incident on the areas or regions of high reflectance 144 formed on the reflector body 142. As shown in FIG. 14, parasitic signals 148 (including Raman-generated signals) formed within the gain media device 120 may be incident on the areas or regions of high transmission, thereby permitting the parasitic signals 148 to be extracted, suppressed, and/or not reflected by the reflectors 140. The areas of high reflectivity are configured to reflect substantially all the amplified output signal 110 through the gain media device 120, while the areas of high transmission are configured to transmit substantially all parasitic signals generated within the gain media device 120 as well as unabsorbed amplified seed signal 86 and unused pump signal 130 (See FIG. 10) during use. As shown, parasitic signal or unused signal 148 may be transmitted through the reflectors 132. In another embodiment, the reflector 140 includes at least one area of high transmission 146 formed by applying at least one anti-reflective coating over the reflector body 142. Thereafter, one or more areas of high reflectance 144 at a desired wavelength may be formed by selectively applying a wavelength-dependent reflector material over the coated reflector body 142.

Figure 15:
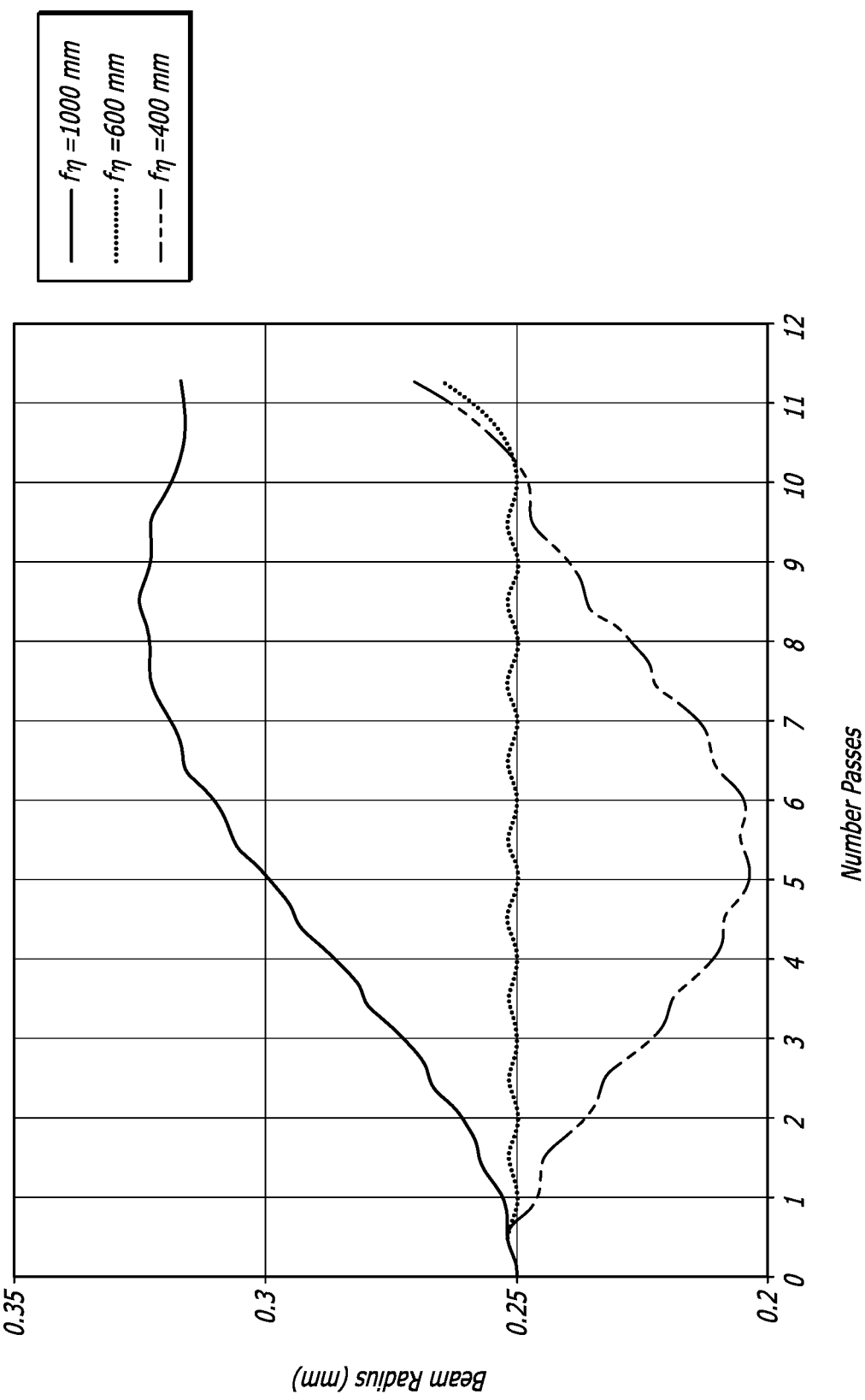
FIG. 15 shows graphically the effect of the thermal lens on amplified seed signal as it passes through gain media device multiple times for three different values of the thermal lens used in an embodiment of a laser system having a multi-stage amplifier.

Referring now to FIG. 8, the gain media device 120 receives one or more than one pump signals 130 from diode pump sources 122. In one embodiment the diode pump sources 122 cause a thermal lens to form in gain media device 120 that is substantially in the vertical direction. When amplified seed signal 86 passes through gain media device 120 multiple times as illustrated in FIGS. 8 and 9, the amplified seed signal 86 may be affected by the thermal lens. FIG. 15 shows the effect of the thermal lens on amplified seed signal 86 as it passes through gain media device 120 multiple times for three different values of the thermal lens. It is evident that there is substantially one value of the thermal lens ($f_{TL}$=600 mm) that results in the size of amplified seed signal 86 remaining substantially unchanged as it passes through the gain media device 120 and exits as amplified output 110. For any other value of the thermal lens the amplified seed signal 86 will change size as it is affected by the thermal lens in gain media device 120. This size change can lead to deleterious effects such as, but not limited to, loss of efficiency from poor overlap with the one or more than one pump beams, beam quality degradation, or even damage if the beam starts to interfere with other components or becomes small enough such as for the case shown in FIG. 15 where the thermal lens is $f_{TL}$=400 mm.

Figure 16:
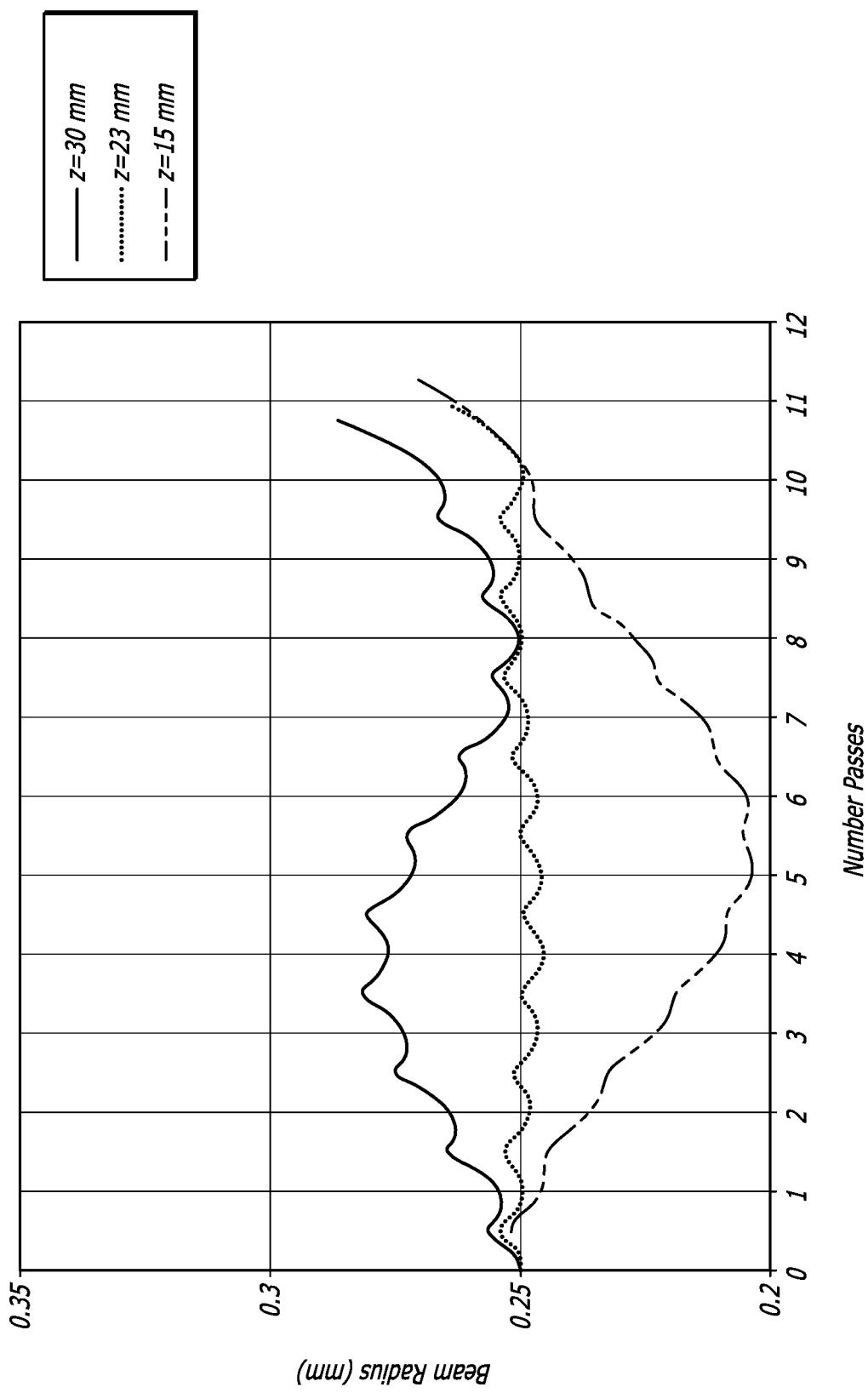
FIG. 16 shows graphically the effects of a variation in the distance between reflectors used in an embodiment of a laser system having a multi-stage amplifier.

FIG. 16 shows the variation of amplified seed signal 86 size for a substantially fixed thermal lens value $f_{TL}$=400 mm for different distances of reflectors 132 from the gain media device 120. If in an alternative embodiment, as shown in FIG. 16, the distance between reflectors 132 and the gain media device 120 was increased from about 15 mm to about 23 mm, amplified seed signal 86 size would again be substantially constant as it passes through gain media device 120 multiple times.

Figure 17:
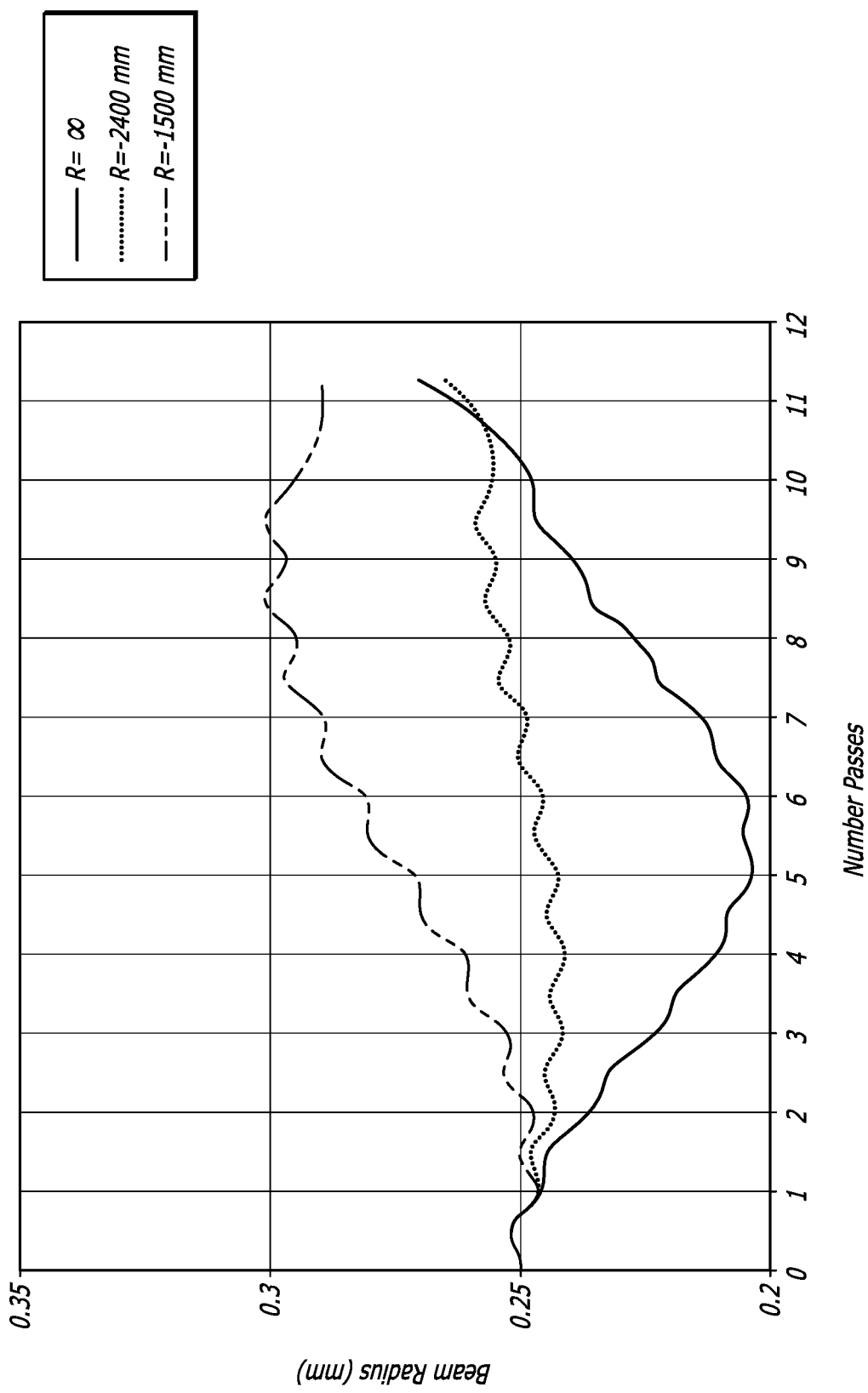
FIG. 17 show graphically the effects of using reflectors curved in the vertical direction on the size the variation of amplified seed signal used in an embodiment of a laser system having a multi-stage amplifier.

FIG. 17 shown the variation of amplified seed signal 86 size for yet another embodiment where the reflectors 132 are curved in the vertical direction. For a thermal lens value of $f_{TL}$=400 mm and a separation of about 15 mm, amplified seed signal 86 size can again be substantially constant through multiple passes through gain media device 120 if the reflectors 132 have a curved surface with a radius of curvature of about −2400 mm.

Figure 18:
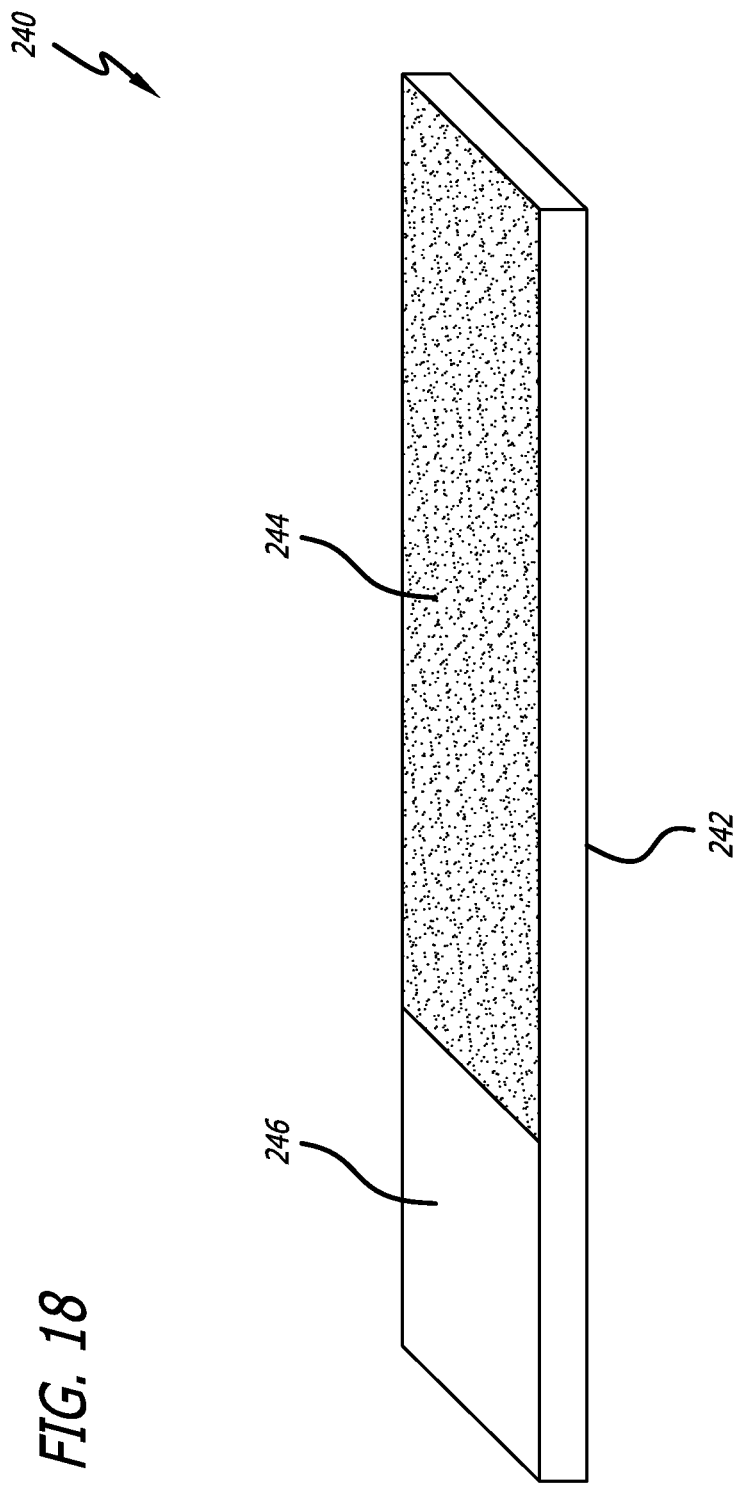
FIG. 18 shows an elevated perspective view of another embodiment of a reflector in an embodiment of a laser system having a multi-stage amplifier wherein the reflector includes areas of high reflectance and areas of high transmission.
Figure 19:
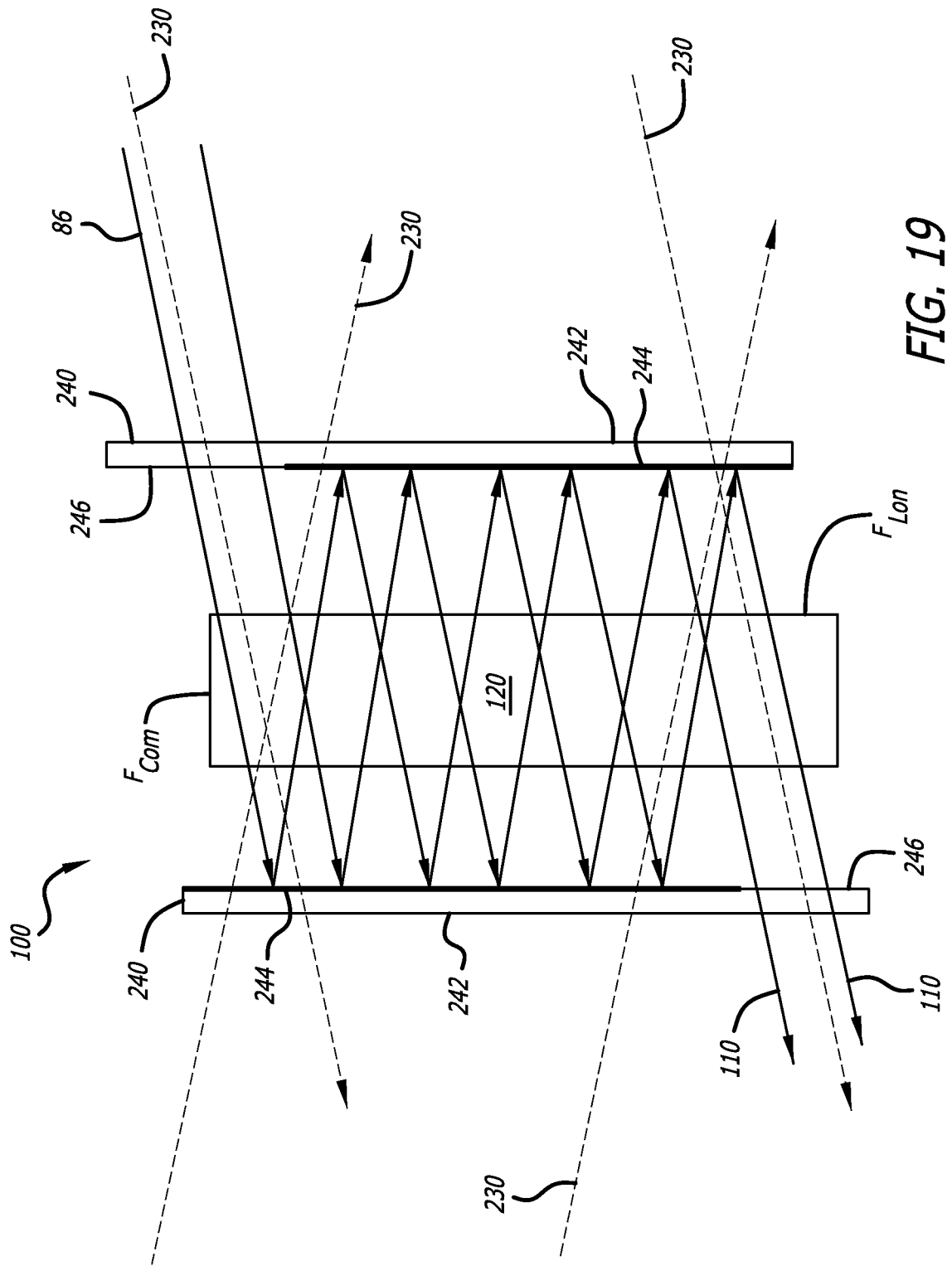
FIG. 19 shows a schematic diagram of an embodiment of a second amplifier stage used in an embodiment of a laser system having a multi-stage amplifier architecture incorporating an embodiment of the reflector device shown in FIG. 18.

FIGS. 18 and 19 shows an alternate embodiment of a novel reflector which may be used in the laser system disclosed herein. As shown in FIG. 18, the mirror or reflector 240 includes a reflector body 242. As shown, the reflector body 242 includes a large, single area or region of high reflectance 244 at a desired wavelength and a single area or region of high transmission 246 at a desired wavelength. For example, the area or region of high transmission 246 may be configured to transmit substantially all optical signals incident thereon. Further, the area or region of high reflectance 244 may be configured to selectively reflect substantially all light having a wavelength of greater than about 1000 nm while selectively transmitting light having a wavelength of less than about 1000 nm there through. In another embodiment, the area or region of high reflectance 244 may be configured to selectively reflect substantially all light having a wavelength of greater than about 1020 nm while transmitting all light having a wavelength of greater than about 1000 nm there through. Optionally, the area or region of high reflectance 244 may be configured to selectively reflect substantially all light having a wavelength of greater than about 1030 nm while transmitting all light having a wavelength of less than about 1000 nm there through. In another embodiment, the reflector 132 may be configured to transmit multiple optical signals. For example, the reflector 132 may be configured to transmit at least one optical signal having a wavelength of less than about 1000 nm and at least one optical signal having a wavelength of greater than about 1100 nm, while substantially reflecting all light having a wavelength of about 1064 nm. In another embodiment, the reflector 132 may be configured to transmit at least one optical signal having a wavelength of less than about 1000 nm and at least one optical signal having a wavelength of greater than about 1100 nm, while substantially reflecting all light having a wavelength of about 1030 nm. In another embodiment, the area of high reflectance 244 and the area of high transmission 246 on the novel reflector body 242 may be substantially the same area. More specifically, the reflector 240 may comprise a dichroic mirror configured to reflect light within a desired wavelength range (i.e. about 1020 nm to about 1100 nm) while transmitting light outside the wavelength range there through. In another embodiment, the the reflector 240 may comprise a notch mirror.

During use, as shown in FIG. 19, the amplified seed signal 86 is incident on the reflector body 242. As shown, the amplified seed signal 86 may be incident along the elongated facet $F_{Lon}$ of the gain media device 120. Similarly, the gain media device 120 may be pumped along the elongated facet $F_{Lon}$ by at least one pump signal 230 as described in FIG. 10. Further, the angle at which the amplified seed signal 86 is incident on the gain media device 120 may be selected to optimize the number of passes of the amplified seed signal 86 through the gain media device 120. The alignment of at least one reflector body 142 may also be configured to optimize the number of passes of the amplified seed signal 86 through the gain media device 12. As a result, the gain media device 120 may be permeated with the amplified seed signal 86, thereby suppressing the generation of parasitic signals (including Raman-generated signals) within the gain media device 120. The areas of high reflectivity 244 are configured to reflect substantially all the amplified output signal 110 generated through multiple passes through the gain media device 120. Further, the areas of high reflectance 244 are configured to transmit unabsorbed seed signal, unused pump signal 230, and/or parasitic signals generated during the amplification process there through. In the illustrated embodiment, the amplified output signal 110 may be extracted from multi-pass amplified 100 via at least one area or region of high transmission 246 formed on at least one reflector 240.

The embodiments disclosed herein are illustrative of the principles of the invention. Other modifications may be employed which are within the scope of the invention. Accordingly, the devices disclosed in the present application are not limited to that precisely as shown and described herein.

What is claimed is:

1. A laser system having a multi-pass amplifier system, comprising;
   at least one seed source configured to output at least one seed signal having a seed signal wavelength;
   at least one pump source configured to provide at least one pump signal having at least one pump signal wavelength;
   at least one first amplifier stage configured to amplify the at least one seed signal to generate at least one amplified seed signal in response thereto;
   at least one multi-pass second amplifier stage configured to receive the at least one amplified seed signal;
   at least one gain media device positioned within the at least one multi-pass second amplifier, the gain media device having at least one elongated facet and at least one compact facet, the at least one gain media device pumped by the at least one pump signal and configured to receive the at least one amplified seed signal and output at least one amplifier output signal having an output wavelength range;
   a first mirror and at least a second mirror positioned within the at least one multi-pass second amplifier stage wherein the at least one gain media device is positioned between the first mirror and at least the second mirror, wherein at least one of the first mirror and the at least one second mirror comprises a reflector body having at least one anti-reflective coating applied thereto thereby forming the at least one area of high transmission, and at least one reflective material selectively applied to the reflector body thereby forming the at least one area of high reflectance, wherein the at least one area of high reflectance comprises a wavelength-dependent reflector;
   at least one optical system in communication with the at least one multi-pass amplifier system and configured to receive the at least one amplifier output signal and output at least one output signal within the output wavelength range.

2. The laser system having a multi-pass amplifier system of claim 1 wherein the at least one seed source comprises at least one gain switched diode laser system.

3. The laser system having a multi-pass amplifier system of claim 1 wherein the at least one seed source comprises at least one fiber-amplified diode laser system.

4. The laser system having a multi-pass amplifier system of claim 1 wherein the at least one seed source is configured to output at least one seed signal having a wavelength of 1000 nm 1100 nm.

5. The laser system having a multi-pass amplifier system of claim 1 wherein the at least one seed source is configured to output at least one seed signal having a wavelength of 1064 nm.

6. The laser system having a multi-pass amplifier system of claim 1 wherein the at least one seed source is configured to output at least one seed signal having a wavelength of 1030 nm.

7. The laser system having a multi-pass amplifier system of claim 1 wherein the at least one pump source comprises multiple fiber-coupled diodes.

8. The laser system having a multi-pass amplifier system of claim 7 wherein the at least one pump source includes at least one positioning feature configured to position one or more fiber optic conduits of the at least one pump source to produce the at least one pump signal output having an elongated profile.

9. The laser system having a multi-pass amplifier system of claim 1 wherein the at least one pump signal wavelength is less than 1000 nm.

10. The laser system having a multi-pass amplifier system of claim 1 wherein the at least one seed source comprises a pulsed seed source having a repetition rate of 100 kHz or more.

11. The laser system having a multi-pass amplifier system of claim 1 wherein the at least one seed source comprises a pulsed seed source having a repetition rate of 10 kHz or more.

12. The laser system having a multi-pass amplifier system of claim 1 wherein the at least one amplified seed signal is incident on the at least one elongated facet of the at least one gain media device.

13. The laser system having a multi-pass amplifier system of claim 1 wherein the at least one pump signal is incident on the at least one elongated facet of the at least one gain media device.

14. The laser system having a multi-pass amplifier system of claim 1 wherein the at least one pump signal and at least one amplified seed signal are incident on the at least one elongated facet of the at least one gain media device.

15. The laser system having a multi-pass amplifier system of claim 1 wherein at least one of the first mirror and the at least one second mirror are angled relative to the gain media device.

16. The laser system having a multi-pass amplifier system of claim 1 wherein the at least one anti-reflective coating is configured to transmit at least one parasitic signal there through.

17. The laser system having a multi-pass amplifier system of claim 16 wherein the at least one parasitic signal comprises a Raman-generated signal.

18. A laser system having a multi-pass amplifier system, comprising;
at least one seed source configured to output at least one seed signal having a seed signal wavelength;
at least one pump source configured to provide at least one pump signal having at least one pump signal wavelength;
at least one first amplifier stage configured to amplify the at least one seed signal to generate at least one amplified seed signal in response thereto;
at least one multi-pass second amplifier stage configured to receive the at least one amplified seed signal;
at least one gain media device positioned within the at least one multi-pass second amplifier, the gain media device having at least one elongated facet and at least one compact facet, the at least one gain media device pumped by the at least one pump signal and configured to receive the at least one amplified seed signal and output at least one amplifier output signal having an output wavelength range;
a first mirror and at least a second mirror positioned within the at least one multi-pass second amplifier stage wherein the at least one gain media device is positioned between the first mirror and at least the second mirror, wherein at least one of the first mirror and the at least one second mirror comprises a curved dichroic mirror;
at least one optical system in communication with the at least one multi-pass amplifier system and configured to receive the at least one amplifier output signal and output at least one output signal within the output wavelength range.

19. The laser system having a multi-pass amplifier system of claim 18 wherein a radius of curvature of the curved mirror is configured to maintain a beam radius of the at least one amplified output seed signal at a substantially constant beam radius when traversing through the at least one gain media device.

* * * * *